US012764820B2

(12) United States Patent
Nilsson et al.

(10) Patent No.: US 12,764,820 B2
(45) Date of Patent: Oct. 13, 2026

(54) COMMON SPATIAL FILTER INDICATION FOR REFERENCE SIGNALS IN MULTI-TRANSMISSION RECEPTION POINT SYSTEMS

(71) Applicant: Telefonaktiebolaget LM Ericsson (publ), Stockholm (SE)

(72) Inventors: Andreas Nilsson, Gothenburg (SE); Siva Muruganathan, Stittsville (CA); Shiwei Gao, Nepean (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 280 days.

(21) Appl. No.: 18/687,331

(22) PCT Filed: Aug. 30, 2022

(86) PCT No.: PCT/IB2022/058139

§ 371 (c)(1),
(2) Date: Feb. 28, 2024

(87) PCT Pub. No.: WO2023/031806

PCT Pub. Date: Mar. 9, 2023

(65) Prior Publication Data

US 2024/0357689 A1 Oct. 24, 2024

Related U.S. Application Data

(60) Provisional application No. 63/238,545, filed on Aug. 30, 2021.

(51) Int. Cl.
*H04W 76/20* (2018.01)
*H04B 7/06* (2006.01)
(Continued)

(52) U.S. Cl.
CPC ........ *H04W 76/20* (2018.02); *H04B 7/06968* (2023.05); *H04L 5/0051* (2013.01); *H04W 80/02* (2013.01)

(58) Field of Classification Search
CPC .. H04W 76/20; H04W 80/02; H04B 7/06968; H04L 5/0051
See application file for complete search history.

(56) References Cited

U.S. PATENT DOCUMENTS

| | | | | |
|---|---|---|---|---|
| 2020/0107352 A1* | 4/2020 | Tsai | ..................... | H04B 7/0691 |
| 2023/0140502 A1* | 5/2023 | Guan | .................... | H04L 5/0053<br>375/262 |

(Continued)

FOREIGN PATENT DOCUMENTS

| | | | |
|---|---|---|---|
| CN | 113316253 | A | 8/2021 |
| WO | 2021169904 | A1 | 9/2021 |
| WO | 2023/026196 | A1 | 3/2023 |

OTHER PUBLICATIONS

Japanese Office Action dated Mar. 10, 2025 and summary English translation of the Japanese Office Action issued in corresponding Japanese Patent Application No. 2024-513284, consisting of 6 pages.

(Continued)

*Primary Examiner* — Deepa Belur
(74) *Attorney, Agent, or Firm* — Weisberg I.P. Law, P.A.

(57) ABSTRACT

A method, network node and wireless device (WD) for common spatial filter indications for reference signals in multiple transmission reception point (TRP) systems are disclosed. According to one aspect, a method in a WD includes receiving at least one of an activation command and an indication for a first and second unified transmission configuration indicator (TCI) state of a plurality of unified TCI states, each of the first and second unified TCI states including quasi co-location (QCL) information for at least
(Continued)

one of downlink reception and uplink transmission of a plurality of at least one of physical channels and reference signals by the WD. The method also includes receiving an association of each of a plurality of references signals with one of the first and second unified TCI states.

20 Claims, 19 Drawing Sheets

(51) Int. Cl.
*H04L 5/00* (2006.01)
*H04W 80/02* (2009.01)

(56) References Cited

U.S. PATENT DOCUMENTS

| | | | | |
|---|---|---|---|---|
| 2023/0155773 | A1* | 5/2023 | Zhang | H04W 72/232 370/329 |
| 2023/0171062 | A1* | 6/2023 | Khoshnevisan | H04B 7/06968 370/329 |
| 2024/0129772 | A1* | 4/2024 | Laddu | H04B 7/022 |
| 2024/0324047 | A1* | 9/2024 | Wang | H04W 24/08 |
| 2024/0349375 | A1* | 10/2024 | Park | H04L 5/0094 |
| 2025/0192966 | A1* | 6/2025 | Gao | H04L 5/0023 |

OTHER PUBLICATIONS

3GPP TSG-RAN WG4 Meeting # 100-e; R4-2112601; Source: Nokia, Nokia Shanghai Bell; Title: Discussion on General and RRM requirements impacts; Agenda item: 9.19.3.1; Document for: Discussion; Electronic Meeting, Aug. 16-27, 2021, consisting of 10 pages.

3GPP TSG-RAN WG4 Meeting # 100-e; R4-2113307; Source: Samsung; Title: Impact to RRM requirements for further enhancements on MIMO; Agenda Item: 9.19.3.1; Document for: Discussion; Electronic Meeting, Aug. 16-27, 2021, consisting of 8 pages.

3GPP TSG RAN WG4 Meeting #100-e; R4-2113510; Source: Ericsson; Title: Discussion on RRM requirements for multi-beam operation in FeMIMO; Agenda Item: 9.19.3.2; Document for: Approval; Electronic Meeting, Aug. 16-27, 2021, consisting of 8 pages.

3GPP TSG-RAN WG4 Meeting #100-e; R4-2113823; Title: Discussion on multi-beam operation enhancements for R17 NR FeMIMO; Source: Huawei, HiSilicon; Agenda item: 9.19.3.2; Document for: Discussion; Electronic Meeting, Aug. 16-27, 2021, consisting of 6 pages.

International Search Report and Written Opinion dated Jan. 3, 2023 issued in PCT Application No. PCT/IB2022/058139 filed Aug. 30, 2022, consisting of 16 pages.

3GPP TSG RAN WG1 #104-e, R1-2102112, e-Meeting, Jan. 25-Feb. 5, 2021, Agenda item: 8.1.1; Source: Moderator (Samsung); Title: Moderator summary#6 for multi-beam enhancement: Round 3B; Document for: Discussion and Decision, consisting of 43 pages.

3GPP TS 38.212 V16.6.0 (Jun. 2021) 3rd Generation Partnership Project; Technical Specification Group Radio Access Network; NR; Multiplexing and channel coding (Release 16), consisting of 153 pages.

3GPP TS 38.214 V16.6.0 (Jun. 2021) 3rd Generation Partnership Project; Technical Specification Group Radio Access Network; NR; Physical layer procedures for data (Release 16), consisting of 172 pages.

3GPP TS 38.321 V16.5.0 (Jun. 2021) 3rd Generation Partnership Project; Technical Specification Group Radio Access Network; NR; Medium Access Control (MAC) protocol specification (Release 16), consisting of 157 pages.

3GPP TS 38.331 V16.5.0 (Jun. 2021) 3rd Generation Partnership Project; Technical Specification Group Radio Access Network; NR; Radio Resource Control (RRC) protocol specification (Release 16), consisting of 959 pages.

Communication Pursuant to Article 94(3) EPC dated Oct. 23, 2025 issued in corresponding European Application No. 22 772 601.5, consisting of 9 pages.

* cited by examiner

JOINT UL/DL BEAM INDICATION

| TCI FIELD CODEPOINT | 0 | 1 | 2 | 3 | 4 | 5 | 6 | 7 |
|---|---|---|---|---|---|---|---|---|
| DLTCI STATES | DLTCI 3 | DLTCI 7 | DLTCI 9 | DLTCI 10 | DLTCI 25 | DLTCI 36 | DLTCI 40 | DLTCI 50 |

FIG. 22

| | | | | | | | |
|---|---|---|---|---|---|---|---|
| DLTCI 3 | DLTCI 7 | DLTCI 9 | DLTCI 10 | DLTCI 25 | DLTCI 36 | DLTCI 36 | DLTCI 36 |
| DLTCI 38 | DLTCI 38 | DLTCI 38 | DLTCI 39 | DLTCI 43 | DLTCI 43 | DLTCI 55 | DLTCI 57 |

FIG. 23

SEPARATE UL/DL B EAM INDICATION

| TCI FIELD CODEPOINT | 0 | 1 | 2 | 3 | 4 | 5 | 6 | 7 |
|---|---|---|---|---|---|---|---|---|
| DLTCI STATES | DLTCI 3 | DLTCI 7 | DL TCI 9 | DLTCI 10 | DLTCI 25 | DLTCI 36 | DLTCI 12 | DLTCI 31 |
| UL TCI STATES | DLTCI 2 | DLTCI 9 | DL TCI 1 | DLTCI 12 | DLTCI 7 | DLTCI 20 | DLTCI 42 | DLTCI 57 |

FIG. 24

SEPARATE UL/DL BEAM INDICATIONF OR mTRP OPERATION

| TCI FIELD CODEPOINT | 0 | 1 | 2 | 3 | 4 | 5 | 6 | 7 | |
|---|---|---|---|---|---|---|---|---|---|
| DL TCI STATES | DLTCI 3 | DL TCI 7 | DL TCI 9 | DL TCI 10 | DL TCI 25 | DL TCI 36 | DL TCI 12 | DLTCI 31 | UPDATING DL/UL SPATIAL FILTER FOR FIRST C OMMON BEAM (TRP) |
| UL TCI STATES | DLTCI 2 | DL TCI 9 | DL TCI 1 | DL TCI 12 | DL TCI 7 | DL TCI 20 | DL TCI 42 | DLTCI 57 | |
| DL TCI STATES | DLTCI 38 | DL TCI 47 | DL TCI 49 | DL TCI 50 | DL TCI 55 | DL TCI 56 | DL TCI 57 | DLTCI 58 | UPDATING DL/UL SPATIAL FILTER FOR FIRST C OMMON BEAM (TRP) |
| UL TCI STATES | DLTCI 42 | DL TCI 39 | DL TCI 41 | DL TCI 52 | DL TCI 57 | DL TCI 60 | DL TCI 62 | DLTCI 58 | |

FIG. 25

SEPARATE UL/DL BEAM INDICATION FOR mTRP OPERATION

| TCI FIELD CODEPOINT | 0 | 1 | 2 | 3 | 4 | 5 | 6 | 7 | |
|---|---|---|---|---|---|---|---|---|---|
| DL TCI STATES | | DL TCI 7 | DL TCI 9 | DL TCI 10 | | DL TCI 36 | DL TCI 12 | DL TCI 31 | UPDATING DL/UL SPATIAL FILTER FOR FIRST COMMON BEAM (TRP) |
| UL TCI STATES | DL TCI 2 | | DL TCI 1 | DL TCI 12 | | DL TCI 20 | DL TCI 42 | DL TCI 57 | |
| DL TCI STATES | DL TCI 38 | DL TCI 47 | DL TCI 49 | | DL TCI 55 | DL TCI 56 | DL TCI 57 | DL TCI 58 | UPDATING DL/UL SPATIAL FILTER FOR FIRST COMMON BEAM (TRP) |
| UL TCI STATES | DL TCI 42 | DL TCI 39 | | | DL TCI 57 | DL TCI 60 | DL TCI 62 | DL TCI 58 | |

FIG. 26

```
-- ASN1START

COMMONBEAMINDEX1 =              SEQUENCE {
NZP-CSI-RS-RESOURCESETLIST          SEQUENCE (SIZE (1..MAXNROFNZP-CSI-RS-RESOURCESETSPERCONFIG)) OF NZP-CSI-RS-RESOURCESETID
SRS-RESOURCESETLIST                 SEQUENCE (SIZE (1.. MAXNROFSRS-RESOURCESETS)) OF SRS-RESOURCESETID

COMMONBEAMINDEX2 =              SEQUENCE {
NZP-CSI-RS-RESOURCESETLIST          SEQUENCE (SIZE (1..MAXNROFNZP-CSI-RS-RESOURCESETSPERCONFIG)) OF NZP-CSI-RS-RESOURCESETID
SRS-RESOURCESETLIST                 SEQUENCE (SIZE (1.. MAXNROFSRS-RESOURCESETS)) OF SRS-RESOURCESETID

}
-- ASN1STOP
```

FIG. 27

```
-- ASN1START
-- TAG-CSI-RESOURCECONFIG-START

CSI-RESOURCECONFIG ::=      SEQUENCE {
   CSI-RESOURCECONFIGID        CSI-RESOURCECONFIGID
   CSI-RS-RESOURCESETLIST      CHOICE {
       NZP-CSI-RS-SSB                 SEQUENCE {
            NZP-CSI-RS-RESOURCESETLIST    SEQUENCE {SIZE (1..MAXNROFNZP-CSI-RS-RESOURCESETSPERCONFIG)) OF NZP-CSI-RS RESOURCESETID
                                                                                              OPTIONAL, -- NEED R
            CSI-SSB-RESOURCESETLIST       SEQUENCE {SIZE (1...MAXNROFCSI-SSB-RESOURCESETSPERCONFIG)) OF CSI-SSB-RESOURCESETID
                                                                                              OPTIONAL, -- NEED R
       },
       CSI-IM-RESOURCESETLIST        SEQUENCE (SIZE {1...MAXNROFCSI-IM-RESOURCESETSPERCONFIG)) OF CSI-IMRESOURCESETID
    },

    BWP-ID                      BWP-ID
    RESOURCETYPE?               ENUMERATED { APERIODIC, SEMIPERSISTENT, PERIODIC },
    ...
    COMMONBEAMINDEX             ENUMERATED {1,2}
}

-- TAG-CSI-RESOURCECONFIG-STOP
```

FIG. 28

COMMON SPATIAL FILTER INDICATION FOR REFERENCE SIGNALS IN MULTI-TRANSMISSION RECEPTION POINT SYSTEMS

CROSS-REFERENCE TO RELATED APPLICATIONS

This application is a Submission Under 35 U.S.C. § 371 for U.S. National Stage Patent Application of International Application No.: PCT/IB2022/058139, filed Aug. 30, 2022 entitled "COMMON SPATIAL FILTER INDICATION FOR REFERENCE SIGNALS IN MULTI-TRANSMISSION RECEPTION POINT SYSTEMS," which claims priority to U. S. Provisional Application No.: 63/238,545, filed Aug. 30, 2021, entitled "COMMON SPATIAL FILTER INDICATION FOR REFERENCE SIGNALS IN MULTI-TRANSMISSION RECEPTION POINT SYSTEMS," the entireties of both of which are incorporated herein by reference.

TECHNICAL FIELD

The present disclosure relates to wireless communications, and in particular, to common spatial filter indication for reference signals in multiple transmission reception point (TRP) systems.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

Wireless communication systems according to the 3GPP may include the following channels:

A physical downlink control channel, PDCCH;
A physical uplink control channel, PUCCH;
A physical downlink shared channel, PDSCH;
A physical uplink shared channel, PUSCH;
A physical broadcast channel, PBCH; and
A physical random access channel, PRACH.

In New Radio (NR), several signals can be transmitted from different antenna ports at the same base station. These signals can have the same large-scale properties such as Doppler shift and Doppler spread, average delay spread, or average delay. These antenna ports are then said to be quasi co-located (QCL).

If the WD knows that two antenna ports are QCL with respect to a certain parameter (e.g., Doppler spread), the WD can estimate that parameter based on one of the antenna ports and apply that estimate for receiving the signal on the other antenna port.

For example, there may be a QCL relation between a channel state information reference signal (CSI-RS) for tracking reference signal (TRS) and the PDSCH demodulation reference signal (DMRS). When the WD receives the PDSCH DMRS, the WD can use the measurements already made on the TRS to assist the DMRS reception.

Information about what assumptions can be made regarding QCL is signaled to the WD from the network. In NR, four types of QCL relations between a transmitted source RS and transmitted target RS were defined:

Type A: {Doppler shift, Doppler spread, average delay, delay spread};
Type B: {Doppler shift, Doppler spread};
Type C: {average delay, Doppler shift}; and
Type D: {Spatial receive (RX) parameter}.

QCL type D was introduced to facilitate beam management with analog beamforming and is known as spatial QCL. There is currently no strict definition of spatial QCL, but one understanding is that if two transmitted antenna ports are spatially QCL, the WD can use the same Rx beam to receive them. This is helpful for a WD that uses analog beamforming to receive signals, since the WD needs to adjust its receive (RX) beam in some direction prior to receiving a certain signal. If the WD knows that a first signal received earlier is spatially QCL with a second signal received subsequent to the first signal, then the WD can safely use the same RX beam to receive the second signal. Note that for beam management, QCL Type D, is considered, but it is also necessary to convey a Type A QCL relation for the reference signals to the WD, so that the base station (network node) can estimate all the relevant large-scale parameters.

Typically, this is achieved by configuring the WD with a CSI-RS for tracking (TRS) used for time and frequency offset estimation. To be able to use any QCL reference, the WD would have to receive the QCL reference with a sufficiently good signal to interference plus noise ratio (SINR). In many cases, this means that the TRS must be transmitted in a suitable beam to a certain WD.

To introduce dynamics in beam and transmission reception point (TRP) selection, the WD can be configured through radio resource control (RRC) signaling with up to 128 TCI (Transmission Configuration Indicator) states. The TCI state information element is as follows:

```
TCI-State ::=           SEQUENCE {
   tci-StateId             TCI-StateId,
   qcl-Type1                  QCL-Info,
   qcl-Type2                  QCL-Info
   ...
{
QCL-Info ::=               SEQUENCE {
   cell                 ServCellIndex
   bwp-Id                  BWP-Id
   referenceSignal               CHOICE {
      csi-rs               NZP-CSI-RS-ResourceId,
      ssb                  SSB-Index
   },
   qcl-Type                ENUMERATED { typeA, typeB, typeC, typeD},
   ...
}
```

Each TCI state contains QCL information related to one or two RSs. For example, a TCI state may contain CSI-RS1 associated with QCL Type A and CSI-RS2 associated with QCL TypeD. If a third RS, e.g., the PDCCH DMRS, has this TCI state as QCL source, then the WD can derive Doppler shift, Doppler spread, average delay, delay spread from CSI-RS1 and Spatial RX parameter (i.e., the RX beam to use) from CSI-RS2 when performing channel estimation for the PDCCH DMRS.

A first list of available TCI states is configured for PDSCH, and a second list of TCI states is configured for PDCCH. Each TCI state contains a pointer, known as TCI State ID, which points to the TCI state. The network then activates via medium access control (MAC) control element (CE) one TCI state for PDCCH and up to eight TCI states for PDSCH. The number of active TCI states the WD supports is a WD capability, but the maximum is 8.

Assume a WD has 4 activated TCI states (from a list of 64 configured TCI states). Hence, 60 TCI states are inactive for this particular WD and the WD need not be prepared to have large scale parameters estimated for those inactive TCI states. But the WD continuously tracks and updates the large scale parameters for the RSs in the 4 active TCI states. When scheduling a PDSCH to a WD, the downlink control information (DCI) contains a pointer to one activated TCI state. The WD then knows which large scale parameter estimate to use when performing PDSCH DMRS channel estimation and thus PDSCH demodulation.

As long as the WD can use any of the currently activated TCI states, it is sufficient to use DCI signaling. However, at some point in time, none of the source RSs in the currently activated TCI states can be received by the WD, i.e., when the WD moves out of the beams in which the source RSs in the activated TCI states are transmitted. When this happens (or actually before this happens), the network node would have to activate new TCI states. Typically, since the number of activated TCI states is fixed, the network node would also have to deactivate one or more of the currently activated TCI states.

The two-step procedure related to TCI state update is illustrated in FIG. 1.

TCI States Activation/Deactivation for WD-Specific PDSCH Via MAC CE

The structure of the MAC CE for activating/deactivating TCI states for WD specific PDSCH is illustrated in FIG. 2

As shown in FIG. 2, the MAC CE contains the following fields:

- Serving Cell ID: This field indicates the identity of the Serving Cell for which the MAC CE applies. The length of the field is 5 bits;
- Bandwidth part (BWP) ID: This field contains the ID corresponding to a downlink bandwidth part for which the MAC CE applies. The BWP ID is given by the higher layer parameter BWP-Id as specified in the 3GPP Technical Standard (TS) 38.331. The length of the BWP ID field is 2 bits since a WD can be configured with up to 4 BWPs for the downlink (DL);
- A variable number of fields Ti: If the WD is configured with a TCI state with TCI State ID i, then the field Ti indicates the activation/deactivation status of the TCI state with TCI State ID i. If the WD is not configured with a TCI state with TCI State ID i, the MAC entity ignores the Ti field. The Ti field is set to "1" to indicate that the TCI state with TCI State ID i is activated and mapped to a codepoint of the DCI Transmission Configuration Indication field, as specified in the 3GPP TS 38.214/38.321. The Ti field is set to "O" to indicate that the TCI state with TCI State ID i is to be deactivated and is not mapped to any codepoint of the DCI Transmission Configuration Indication field. It is noted that the codepoint to which the TCI State is mapped is determined by the ordinal position among all the TCI States with Ti field set to "1". That is, the first TCI State with Ti field set to "1" is mapped to the codepoint value 0 of DCI Transmission Configuration Indication field, the second TCI State with Ti field set to "1" is mapped to the codepoint value 1 of DCI Transmission Configuration Indication field, and so on. In 3GPP NR Rel-15, the maximum number of activated TCI states is 8; and
- A Reserved bit R: this bit is set to '0' in 3GPP NR Rel-15.

Note that the TCI States Activation/Deactivation for WD-specific PDSCH MAC CE are identified by a MAC protocol data unit (PDU) subheader with logical channel ID (LCID) as specified in Table 6.2.1-1 of the 3GPP TS 38.321. The MAC CE for Activation/Deactivation of TCI States for WD-specific PDSCH has variable size.

TCI State Indication for WD-Specific PDSCH Via DCI

The network node can use DCI format 1_1 or 1_2 to indicate to the WD that should use one of the activated TCI states for the subsequent PDSCH reception. The field being used in the DCI is a transmission configuration indication (TCI), which is 3 bits if tci-PresentInDCI is "enabled" or tci-PresentForDCI-Format1-2-r16 is present respectively for DCI format 1_1 and DCI 1_2 by higher layer. One example of such a DCI indication is illustrated in FIG. 3.

DCI code point 0 indicates the first TCI state index in the list of TCI states, DCI code point 1 indicates the second TCI state index in the list, and so on.

Multi-TRP TCI State Operation

In 3GPP Release 16 (3GPP Rel-16), a multi-TRP (multiple-transmission reception point) operation was specified with two modes, single DCI based multi-TRP and multiple DCI based multi-TRP.

In 3GPP NR Rel-16, multiple DCI scheduling is for multi-TRP in which a WD may receive two DCIs each scheduling a PDSCH and PUSCH. The two DCIs (carried by respective PDCCHs which schedule respective PDSCHs) are transmitted from the same TRP.

For multi-DCI multi-TRP operation, a WD needs to be configured with two CORESET pools, each associated with a TRP. Each CORESET pool is a collection of CORESETs that belongs to the same CORESET pool. A CORESET pool index can be configured in each CORESET with a value of 0 or 1. For the two DCIs in the above example, they are transmitted via respective PDCCHs in two CORESETs belonging to different CORESET pools (i.e., with CORESETPoolIndex 0 and 1 respectively). For each CORESET Pool, the same TCI state operation method in terms of activation/deactivation/indication as described above is assumed.

The other multi-TRP mode, single DCI based multi-TRP, needs two DL TCI states to be associated to one DCI codepoint. That is, when a TCI field codepoint in DCI indicates two TCI states, each TCI state corresponding to a different beam or different TRP. The activation and mapping of 2 TCI states for a codepoint in the TCI field of DCI is done with the below MAC CE from 3GPP TS 38.321:

Enhanced TCI States Activation/Deactivation for WD-Specific PDSCH MAC CE

The Enhanced TCI States Activation/Deactivation for WD-specific PDSCH MAC CE is identified by a MAC PDU subheader with eLCID, as shown in FIG. 4, and has a variable size consisting of following fields:

- Serving Cell ID: This field indicates the identity of the Serving Cell for which the MAC CE applies. The length of the field is 5 bits;
- BWP ID: This field indicates a DL BWP for which the MAC CE applies as the codepoint of the DCI bandwidth part indicator field as specified in 3GPP TS 38.212. The length of the BWP ID field is 2 bits;
- Ci: This field indicates whether the octet containing TCI state IDi,2 is present. If this field is set to "1", the octet containing TCI state IDi,2 is present. If this field is set to "0", the octet containing TCI state IDi,2 is not present;
- TCI state IDi,j: This field indicates the TCI state identified by TCI-StateId as specified in 3GPP TS 38.331, where i is the index of the codepoint of the DCI Transmission configuration indication field as specified in 3GPP TS 38.212 and TCI state IDi,j denotes the jth TCI state indicated for the ith codepoint in the DCI TCI field. The TCI codepoint to which the TCI States are mapped is determined by its ordinal position among all the TCI codepoints with sets of TCI state IDi,j fields, i.e., the first TCI codepoint with TCI state ID0,1 and TCI state ID0,2 is mapped to the codepoint value 0, the second TCI codepoint with TCI state ID1,1 and TCI state ID1,2 is mapped to the codepoint value 1 and so on. The TCI state IDi,2 is optional based on the indication of the Ci field. The maximum number of activated TCI codepoints is 8 and the maximum number of TCI states mapped to a TCI codepoint is 2; and R: Reserved bit, set to "0".

Inter-Cell Multi-TRP Operation

In 3GPP Rel-17, inter-cell multi-TRP operation are to be specified. This is an extension of either single DCI based multi-TRP or multiple DCI based multi-TRP operation of 3GPP Rel-16. The intercell aspect of 3GPP Rel-17 refers to the case when the two TRPs are associated to different synchronization signal blocks (SSB) associated with different PCIs (Physical Cell IDs). That is, the TCI state that refers to transmission from TRP 1 or TRP 2 is quasi-collocated to a reference signal that is either one of the SSB beams with the PCI belonging to that TRP, or is quasi-collocated to another reference signal like CSI-RS or DMRS that has root quasi-collocation to one of the SSB beams with PCI belonging to that TRP.

3GPP Rel-17 TCI State Framework

In 3GPP Rel-17 a new unified TCI state framework will be specified, which aims to streamline the indication of transmit/receive spatial filtering (and other QCL properties) to the WD by letting a single TCI state indicate QCL properties for multiple different DL and/or uplink (UL) signals/channels. To which DL/UL signals/channels that the unified TCI state framework should be applied is still being considered by the 3GPP. See the following statement from RAN1 #104-e:

Statement

In 3GPP Rel-17, a unified TCI framework, the following has been considered by RAN1 #104bis-e:

Whether DL or, if applicable, joint TCI also applies to the following signals. If not, for future study (FFS) any other enhancement over 3GPP Rel-15/16:

CSI-RS resources for CSI;

Some CSI-RS resources for beam management (BM), if so, which ones (e.g., aperiodic, repetition 'ON');

CSI-RS for tracking;

Whether UL or, if applicable, joint TCI also applies to the following signals:

Some sounding reference signal (SRS) resources or resource sets for BM.

Note that the term 'joint TCI' in the above statement, refers to a 'joint DL/UL TCI state'.

In meeting RAN1 #103-e it was considered that the new unified TCI state framework should include a three stage TCI state indication (in a way that is similar to that described above for PDSCH) for all or a subset of all DL and/or UL channels/signals. In the first stage, radio resource control (RRC) is used to configure a pool of TCI states. In the second stage, one or more of the RRC configured TCI states are activated via MAC-CE signaling and associated to different TCI field codepoints in DCI format 1_1 and 1_2. Finally, in the third stage, DCI signaling is used to select one of the TCI states (or two TCI states in case separate TCI states are used for DL channels/signals and UL channels/signals) that was activated via MAC-CE.

In RAN1 #103-e meeting, there has been consideration of support for both joint beam indication ("Joint DL/UL TCI") and separate DL/UL beam indication ("Separate DL/UL TCI"), as can be seen in the statements below. For Joint DL/UL TCI, a single TCI state (which for example can be a DL TCI state or a Joint DL/UL TCI state) is used to determine a transmit/receive spatial filter for both DL signals/channels and UL signals/channels. For Separate DL/UL TCI, one TCI state (for example a DL TCI state) can be used to indicate a receive spatial filter for DL signals/channels and a separate TCI state (for example an UL TCI state) can be used to indicate a transmit spatial filter for UL signals/channels.

Statement

On beam indication signaling medium to support joint or separate DL/UL beam indication in 3GPP Rel-17 unified TCI framework:

Support L1-based beam indication using at least WD-specific (unicast) DCI to indicate joint or separate DL/UL beam indication from the active TCI states:

The existing DCI formats 1_1 and 1_2 are reused for beam indication;

Support activation of one or more TCI states via MAC CE analogous to 3GPP Rel-15/16.

Statement

On 3GPP Rel-17 unified TCI framework, to accommodate the case of separate beam indication for UL and DL:

Utilize two separate TCI states, one for DL and one for UL;

For the separate DL TCI:

The source reference signal(s) in M TCIs provide QCL information at least for WD-dedicated reception on PDSCH and for WD-dedicated reception on all or subset of CORESETs in a component carrier (CC);

For the separate UL TCI:

The source reference signal(s) in N TCIs provide a reference for determining common UL transmit (TX) spatial filter(s) at least for dynamic-grant/configured-grant based PUSCH, all or a subset of dedicated PUCCH resources in a CC;

Optionally, the UL TX spatial filter can also apply to all SRS resources in resource set(s) configured for antenna switching/codebook-based/non-codebook-based UL transmissions; and/or For future study (FFS): Whether the UL TCI state is taken from a common/same or separate TCI state pool from DL TCI state.

NR uses CP-OFDM (Cyclic Prefix Orthogonal Frequency Division Multiplexing) in both downlink (DL) (i.e., from a network node, gNB, or base station, to a wireless device (WD)) and uplink (UL) (i.e. from WD to gNB). Discrete Fourier transform (DFT) spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f$=15 kHz, there is only one slot per subframe, and each slot consists of 14 OFDM symbols.

Data scheduling in NR is typically on a per slot basis, an example is shown in FIG. 5 with a 14-symbol slot, where the first two symbols contain the PDCCH and the rest of the symbols contain either the PDSCH or PUSCH.

Different subcarrier spacing values are supported in NR. The supported subcarrier spacing values (also referred to as different numerologies) are given by $\Delta f=(15\times 2^{\mu})$ kHz where $\mu\in\{0,1,2,3,4\}$. $\Delta f=15$ kHz is the basic subcarrier spacing. The slot durations at different subcarrier spacings is given by $$\frac{1}{2^{\mu}}\text{ ms.}$$

In the frequency domain, a system bandwidth is divided into resource blocks (RBs), each corresponds to 12 contiguous subcarriers. The RBs are numbered starting with 0 from one end of the system bandwidth. The basic NR physical time-frequency resource grid is illustrated in FIG. 6, where only one resource block (RB) within a 14-symbol slot is shown. One OFDM subcarrier during one OFDM symbol interval forms one resource element (RE).

Beam Management

At millimeter wave (mmW) frequencies, concepts for handling mobility between beams (both within and between TRPs) have been considered in NR. At these frequencies, where high-gain beamforming is used, each beam is only optimal within a small area, and the link budget outside the optimal beam deteriorates quickly. Hence, frequent and fast beam switching may be needed to maintain high performance. To support such beam switching, a beam indication framework has been considered in NR. For example, for downlink data transmission (PDSCH), the downlink control information (DCI) contains a transmission configuration indicator (TCI) field that informs the WD which beam is used so that the WD can adjust its receive beam accordingly. This is beneficial for the case of analog Rx beamforming where the WD needs to determine and apply the Rx beamforming weights before the WD can receive the PDSCH.

In what follows, the terminology "spatial filtering weights" or "spatial filtering configuration," refers to the antenna weights that are applied at either the transmitter (gNB or WD) and the receiver (WD or gNB) for data/control transmission/reception. This term is more general in the sense that different propagation environments lead to different spatial filtering weights that match the transmission/reception of a signal to the channel. The spatial filtering weights may not always result in a beam in a strict sense.

Prior to data transmission, a training phase is required in order to determine the gNB and WD spatial filtering configurations. This is illustrated in FIG. 7, and is referred to in NR as DL beam management. In NR, two types of reference signals (RSs) are used for DL beam management operations: the channel state information RS (CSI-RS) and the synchronization signal/physical broadcast control channel (SS/PBCH) block, or SSB for short. FIG. 7 shows an example where CSI-RS is used to find an appropriate beam pair link (BPL), meaning a suitable gNB transmit spatial filtering configuration (gNB transmit (Tx) beam) plus a suitable WD receive spatial filtering configuration (UE Rx beam) resulting in sufficiently good link budget Thus, FIG. 7 illustrates a beam training phase followed by a data transmission phase. For downlink data/control transmission, the gNB indicates to the WD that the PDCCH/PDSCH DMRS is spatially quasi-co-located (QCL) with RS6—the RS on which the WD performs measurements during the WD beam sweep in the beam training phase. At least for uplink control channel transmission, the gNB indicates to the WD that RS6 is the spatial relation for PUCCH.

In the above example, in the gNB Tx beam sweep, the gNB configures the WD to measure on a set of 5 CSI-RS resources (RS1 . . . . RS5) which are transmitted with 5 different spatial filtering configurations (Tx beams). The WD is also configured to report back the RS ID and the reference-signal receive power (RSRP) of the CSI-RS corresponding to the maximum measured RSRP. In this example, the maximum measured RSRP corresponds to RS4. In this way the gNB learns what is the preferred Tx beam from the WD perspective. In the subsequent WD Rx beam sweep, the gNB transmits a number of CSI-RS resources in different OFDM symbols all with the same spatial filtering configuration (Tx beam) as was used to transmit RS4 previously. The WD then tests a different Rx spatial filtering configuration (Rx beam) in each OFDM symbol in order to maximize the received RSRP. The WD remembers the RS ID (RS ID 6 in this example) and the corresponding spatial filtering configuration that results in the largest RSRP. The network can then refer to this RS ID in the future when DL data is scheduled to the WD, thus allowing the WD to adjust its Rx spatial filtering configuration (Rx beam) to receive the PDSCH. As mentioned above, the RS ID is contained in a transmission configuration indicator (TCI) that is carried in a field in the DCI that schedules the PDSCH.

Channel State Information (CSI) and CSI Feedback

A core component in LTE and NR is the support of multiple input-multiple output (MIMO) antenna deployments and MIMO related techniques. Spatial multiplexing is one of the MIMO techniques used to achieve high data rates in favorable channel conditions.

For an antenna array with $N_T$ antenna ports at the gNB for transmitting r DL symbols $s=[s_1, s_2, \ldots, s_r]^T$, the received signal at a WD with $N_R$ receive antennas at a certain RE n can be expressed as:

$$y_n = H_n W s + e_n$$

where $y_n$ is a $N_R\times 1$ received signal vector; $H_n$ a $N_R\times N_T$ channel matrix at the resource element (RE) between the gNB and the WD; W is an $N_T\times r$ precoder matrix; $e_n$ is a $N_R\times 1$ noise plus interference vector received at the RE by the WD. The precoder W can be a wideband precoder, i.e., constant over a whole bandwidth part (BWP), or a subband precoder, i.e. constant over each subband.

The precoder matrix is typically selected from a codebook of possible precoder matrices, and typically reported by a precoder matrix indicator (PMI), which specifies a unique precoder matrix in the codebook for a given number of symbol streams. Each of the r symbols in s corresponds to a spatial layer. The parameter r is referred to as the rank of the channel and is reported by a rank indicator (RI).

For a given block error rate (BLER), a modulation and coding scheme (MCS) is determined by a WD based on the observed signal to noise and interference ratio (SINR). The SINR is reported by a channel quality indicator (CQI). NR supports transmission of either one or two transport blocks (TBs) to a WD in a slot, depending on the rank. One TB is used for ranks 1 to 4, and two TBs are used for ranks 5 to 8. A CQI is associated with each TB. The CQI/rank indicator (RI)/precoding matrix indicator (PMI) report can be either wideband or subband based on configuration of the network.

In other words, RI, PMI, and CQI are part of channel state information (CSI) and reported by a WD to a network node or gNB.

Channel State Information Reference Signal (CSI-RS) and CSI-IM

A CSI-RS is transmitted on each transmit antenna port and is used by a WD to measure downlink channel associated with each of antenna ports. The antenna ports are also referred to as CSI-RS ports. The supported number of antenna ports in NR are {1,2,4,8,12,16,24,32}. By measuring the received CSI-RS, a WD can estimate the channel the CSI-RS is traversing, including the radio propagation channel and antenna gains. CSI-RS for this purpose is also referred to as Non-Zero Power (NZP) CSI-RS.

NZP CSI-RS can be configured to be transmitted in certain resource elements (Res) per physical resource block (PRB). FIG. 8 shows an example of a NZP CSI-RS resource configuration with 4 CSI-RS ports in a PRB in one slot.

In addition to NZP CSI-RS, Zero Power (ZP) CSI-RS was defined in NR to indicate to a WD that the associated REs are not available for PDSCH scheduling at the gNB. ZP CSI-RS can have the same RE patterns as NZP CSI-RS.

CSI resource for interference measurement, CSI-IM, is also defined in NR for a WD to measure noise and interference, typically from other cells. CSI-IM includes 4 REs in a slot. Two different CSI-IM patterns are defined: The CSI-IM pattern can be either 4 consecutive REs in one OFDM symbol or two consecutive REs in both the frequency domain and the time domain. FIG. 8 is an example. Typically, the gNB does not transmit any signal in the CSI-IM resource so that what observed in the resource is noise and interference from other cells.

CSI Framework in NR

In NR, a WD can be configured with one or multiple CSI report configurations. Each CSI report configuration (defined by a higher layer information element (IE) CSI-ReportConfig) is associated with a bandwidth part (BWP) and contains one or more of:

- a CSI resource configuration for channel measurement;
- a CSI-IM resource configuration for interference measurement;
- a NZP CSI-RS resource for interference measurement;
- reporting type, i.e., aperiodic CSI (on PUSCH), periodic CSI (on PUCCH) or semi-persistent CSI (on PUCCH, and DCI activated on PUSCH);
- report quantity specifying what to be reported, such as RI, PMI, CQI;
- codebook configuration such as type I or type II CSI; and/or
- frequency domain configuration. i.e., subband vs. wideband CQI or PMI, and subband size.

The CSI-ReportConfig IE according to the NR radio resource control (RRC) specification. 3GPP Technical Standard (TS 38.331) is as follows. (with some parameters omitted):

```
CSI-ReportConfig ::=                         SEQUENCE {
    reportConfigId                               CSI-ReportConfigId,
    carrier                                  ServCellIndex          OPTIONAL,   -- Need S
    resourcesForChannelMeasurement                          CSI-ResourceConfigId,
    csi-IM-ResourcesForInterference                     CSI-ResourceConfigId
OPTIONAL,   -- Need R
    nzp-CSI-RS-ResourcesForInterference                        CSI-ResourceConfigId
OPTIONAL,   -- Need R
    reportConfigType                                 CHOICE {
      periodic                                   SEQUENCE {
        reportSlotConfig                                 CSI-ReportPeriodicity AndOffset,
        pucch-CSI-ResourceList                                  SEQUENCE (SIZE
(1..maxNrofBWPs)) OF PUCCH-CSI-Resource
      },
      semiPersistentOnPUCCH                                SEQUENCE {
        reportSlotConfig                                 CSI-ReportPeriodicityAndOffset,
        pucch-CSI-ResourceList                                  SEQUENCE (SIZE
(1..maxNrofBWPs)) OF PUCCH-CSI-Resource
      },
      semiPersistentOnPUSCH                                SEQUENCE {
        reportSlotConfig                                 ENUMERATED { sl5, sl10, sl20, sl40,
sl160, sl320},
        reportSlotOffsetList                             SEQUENCE (SIZE (1.. maxNrofUL-
Allocations)) OF INTEGER(0..32),
        p0alpha                                      P0-PUSCH-AlphaSetId
      },
      aperiodic                                  SEQUENCE {
        reportSlotOffsetList                          SEQUENCE (SIZE (1..maxNrofUL-
Allocations)) OF INTEGER(0..32)
      }
    },
    reportQuantity                               CHOICE {
      none                                     NULL,
      cri-RI-PMI-CQI                                   NULL,
      cri-RI-i1                                  NULL,
      cri-RI-i1-CQI                                    SEQUENCE {
        pdsch-BundleSizeForCSI                                 ENUMERATED {n2, n4}
OPTIONAL   -- Need S
      },
      cri-RI-CQI                                   NULL,
      cri-RSRP                                     NULL,
      ssb-Index-RSRP                                   NULL,
      cri-RI-LI-PMI-CQI                                  NULL
    },
```

-continued

```
    reportFreqConfiguration                              SEQUENCE {
        cqi-FormatIndicator                              ENUMERATED { widebandCQI,
subbandCQI }                                   OPTIONAL,   -- Need R
        pmi-FormatIndicator                              ENUMERATED { widebandPMI,
subbandPMI }                                   OPTIONAL,   -- Need R
    }
```

——Other Parameters are Omitted——

A WD can be configured with one or multiple CSI resource configurations each with a CSI-ResourceConfigId, for channel and interference measurement. Each CSI resource configuration for channel measurement or for NZP CSI-RS based interference measurement can contain one or more NZP CSI-RS resource sets. For each NZP CSI-RS resource set, the CSI resource configuration can further contain one or more NZP CSI-RS resources. A NZP CSI-RS resource can be periodic, semi-persistent, or aperiodic.

Similarly, each CSI-IM resource configuration for interference measurement can contain one or more CSI-IM resource sets. For each CSI-IM resource set, the CSI-IM configuration can further contain one or more CSI-IM resources. A CSI-IM resource can be periodic, semi-persistent, or aperiodic.

Periodic CSI starts after it has been configured by RRC and is reported on the PUCCH, the associated NZP CSI-RS resource(s) and CSI-IM resource(s) are also periodic.

For semi-persistent CSI, the CSI resource configuration can be either on the PUCCH or the PUSCH. Semi-persistent CSI on the PUCCH is activated or deactivated by a medium access control (MAC) control element (CE) command. Semi-persistent CSI on the PUSCH is activated or deactivated by DCI. The associated NZP CSI-RS resource(s) and CSI-IM resource(s) can be either periodic or semi-persistent.

For aperiodic CSI, the CSI is reported on the PUSCH and is activated by a CSI request bit field in DCI. The associated NZP CSI-RS resource(s) and CSI-IM resource(s) can be either periodic, semi-persistent, or aperiodic. The linkage between a code point of the CSI request field and a CSI report configuration is via an aperiodic CSI trigger state. A WD is configured by higher layer with a list of aperiodic CSI trigger states, where each of the trigger states contains an associated CSI report configuration. The CSI request field is used to indicate one of the aperiodic CSI trigger states and thus, one CSI report configuration.

If there are more than one NZP CSI-RS resource set and/or more than one CSI-IM resource set associated with a CSI report configuration, only one NZP CSI-RS resource set and one CSI-IM resource set are selected in the aperiodic CSI trigger state. Thus, each aperiodic CSI report is based on a single NZP CSI-RS resource set and a single CSI-IM resource set.

In case multiple NZP CSI-RS resources are configured in a NZP CSI-RS resource set for channel measurement, the WD would select one NZP CSI-RS resource and report a CSI associated with selected NZP CSI-RS resource. A CRI (CSI-RS resource indicator) would be reported as part of the CSI. In this case, the same number of CSI-IM resources, each paired with a NZP CSI-RS resource, should be configured in the associated CSI-IM resource set. That is, when a WD reports a CRI value k, this corresponds to the (k+1) th entry of the NZP CSI-RS resource set for channel measurement, and, if configured, the (k+1) th entry of the CSI-IM resource set for interference measurement (clause 5.2.1.4.2 of 3GPP TS 38.214).

When NZP CSI-RS resource(s) are configured for interference measurement in a CSI-ReportConfig, only a single NZP-CSI-RS resource in a CSI-RS resource set can be configured for channel measurement in the same CSI-ReportConfig.

QCL

Since the TRPs may be in different physical locations, the propagation channels to the WD can also be different. Different antennas or transmit beams are used in different TRPs. At the WD side, different receive antennas or receive beams may be used to receive from different TRPs. To facilitate receiving PDSCH from different TRPs, TCI (transmission configuration indicator) states were introduced in 3GPP NR Release 15 (Rel-15).

A TCI state contains Quasi Co-location (QCL) information between a Demodulation Reference Signal (DMRS) for PDCCH or PDSCH and one or two DL reference signals such as a CSI-RS or a SSB. The supported QCL information types in NR are:

'QCL-TypeA': {Doppler shift, Doppler spread, average delay, delay spread};

'QCL-TypeB': {Doppler shift, Doppler spread};

'QCL-TypeC": {Doppler shift, average delay}; and

'QCL-TypeD': {Spatial Rx parameter}.

The QCL information is used by a WD to apply one or more channel properties estimated from the DL reference signals (CSI-RS or SSB) to channel estimation based on the DMRS for the PDSCH or PDCCH reception. For example, channel delay spread and Doppler shift parameters can be estimated from the QCL source RS, the estimation is then used for determining the channel filtering parameters for channel estimation based on the DMRS.

Non-Coherent Joint Transmission (NC-JT)

In 3GPP NR Rel-15, only the PDSCH transmission from a single Transmission and Reception Point (TRP) is supported, in which a WD receives the PDSCH from a single TRP at any given time.

In 3GPP NR Rel-16, the PDSCH transmission over multiple TRPs was introduced. One of the multi-TRP schemes is NC-JT, in which a PDSCH to a WD is transmitted over two TRPs with different MIMO layers of the PDSCH transmitted from different TRPs. For example, 2 layers can be transmitted from a first TRP and 1 layer can be transmitted from a second TRP.

NC-JT refers to MIMO data transmission over multiple TRPs in which different MIMO layers are sent over different TRPs. An example is shown in FIG. 9, where a PDSCH is sent to a WD over two TRPs, each carrying one code word. When the WD has 4 receive antennas while each of the TRPs has only 2 transmit antennas, the WD can support up to 4 MIMO layers but there are maximum 2 MIMO layers from each TRP. In this case, by transmitting data over two TRPs to the WD, the peak data rate to the WD can be increased as up to 4 aggregated layers from the two TRPs can be used. This is beneficial when the traffic load and thus the resource utilization, is low in each TRP. The scheme can also be beneficial in the case where the WD is in line of sight (LOS)

of both the TRPs and the rank per TRP is limited even when there are more transmit antennas available at each TRP.

This type of NC-JT is supported in LTE with two TRPs, each up to 8 antenna ports. For CSI feedback purpose, a WD is configured with a CSI process with two NZP CSI-RS resources, one for each TRP, and one interference measurement resource. The WD may report one of the following scenarios:

(1). A WD reports CRI=0, which indicates that CSI is calculated and reported only for the first NZP CSI-RS resource, i.e., a RI, a PMI and a CQI associated with the first NZP CSI-RS resource is reported. This is the case when the WD sees best throughput is achieved by transmitting a PDSCH over the TRP or beam associated with the first NZP CSI-RS resource;

(2). A WD reports CRI=1, which indicates that only CSI is calculated and reported for the first NZP CSI-RS resource, i.e., a RI, a PMI and a CQI associated with the first NZP CSI-RS resource is reported. This is the case when the WD sees best throughput is achieved by transmitting a PDSCH over the TRP or beam associated with the second NZP CSI-RS resource;

(3). A WD reports CRI=2, which indicates both of the two NZP CSI-RS resources. In this case, two set of CSIs, each for one CW, are calculated and reported based on the two NZP CSI-RS resources and by considering inter-CW interference caused by the other CW. The combinations of reported RIs are restricted such that |RI1−RI2|<=1, where RI1 and RI2 respectively correspond to ranks associated with the 1st and the 2nd NXP CSI-RS respectively.

In 3GPP $N_R$ Rel-16, a different approach is adopted where a single carrier wave (CW) is transmitted across two TRPs. An example is shown in FIG. 10, where one layer is transmitted from each of two TRPs.

Two types of NC-JT are supported, i.e., single DCI based N-JT and multi-DCI based NC-JT. In single DCI based NC-JT, it is assumed that a single scheduler is used to schedule data transmission over multiple TRPs, different layers of a single PDSCH scheduled by a single PDCCH can be transmitted from different TRPs.

In multi-DCI based NC-JT, independent schedulers are assumed in different TRPs to schedule PDSCHs to a WD. Two PDSCHs scheduled from two TRPs may be fully or partially overlapped in time and frequency resource. Only semi-static coordination between TRPs may be possible.

NC-JT CSI in 3GPP NR Rel-17

It has been considered in 3GPP RAN1 that for CSI measurement associated with a CSI reporting setting, CSI-ReportConfig, then for NC-JT, there will be:

Ks≥2 NZP CSI-RS resources in a CSI-RS resource set for channel measurement; the Ks resources will be referred to as channel measurement resources (CMR); and Within the Ks CMRs, N≥1 NZP CSI-RS resource pairs for NC-JT CSI whereas each pair is used for a NC-JT CSI measurement hypothesis.

In addition, the Ks≥2 NZP CSI-RS resources in the CSI-RS resource set for CMR can be divided in to two different CMR groups, and that each of the N pairs used for NC-JT CSI measurement hypothesis could be associated with one CMR from each of the two CMR groups.

Furthermore, higher-layer signaling is used to configure the N CMR pairs for the purpose of NC-JT CSI.

In current 3GPP Rel-17 considerations, the focus has been mainly on TCI state updates for a single TRP. However, how to update TCI states of reference signals for single-DCI based multi-TRP operation is still an unresolved issue.

SUMMARY

Some embodiments advantageously provide methods, network nodes and wireless devices for common spatial filter indications for reference signals in multiple transmission point (TRP) systems.

Some embodiments provide ways to associate common transmit/receive spatial filters to different DL/UL reference signals for single-DCI based multi-TRP operation. Some embodiments determine to which DL/UL reference signals the common transmit/receive spatial filters are applied.

In some embodiments, a method is provided for associating one or multiple reference signals to two different applied DL TCI states (or Joint DL/UL TCI States). In some embodiments, the method includes one or more of the following steps:

Step 1: Configuring from the network node to a WD a list of DL TCI states (or joint DL/UL TCI states) via higher layer configuration (RRC configuration) to the WD;

Step 2: Activating a subset of a configured list of DL TCI states (or joint DL/UL TCI states) via MAC CE signaling from the network to the WD, where a codepoint in TCI field in DCI may be mapped to one or more DL TCI states (or joint DL/UL TCI states);

Step 3: Updating N>1 DL TCI states (or joint DL/UL TCI states) to a WD from the network via a DL DCI;

Step 4: Applying the N>1 updated DL TCI states (or joint DL/UL TCI states) to a reference signal or set of reference signals or multiple sets of reference signals; and Step 5: Using the applied DL TCI states and UL TCI states (or joint DL/UL TCI states) to receive and transmit the reference signals.

According to one aspect, a network node configured to communicate with a wireless device, WD, includes processing circuitry configured to: send at least one of an activation command and an indication for a first and a second unified transmission configuration indicator, TCI, state out of a plurality of unified TCI states, each of the first and second unified TCI states including quasi co-location, QCL, information for at least one of downlink reception and uplink transmission of a plurality of at least one of physical channels and reference signals by the WD. The processing circuitry is further configured to: associate each of a plurality of reference signals with one of the first and the second unified TCI states by one of: for each of the first and the second unified TCI states, configuring one or more associated reference signals out of the plurality of reference signals; and for each of the plurality of reference signals, including a pointer in a corresponding reference signal configuration, wherein the pointer pointing to one of the first and the second unified TCI states. The network node also includes a radio interface in communication with the processing circuitry and configured to transmit the associations of the plurality reference signals to the WD.

According to this aspect, in some embodiments, the activation command is a first medium access control, MAC, control element, CE, command to activate a subset of unified TCI states from the plurality of unified TCI states. In some embodiments, the indication is sent in downlink control information, DCI, format when there are more than two unified TCI states activated by the first MAC CE command. In some embodiments, each of the plurality of unified TCI states is one of (a) a joint downlink, DL, and an uplink, UL TCI state, (b) a DL TCI state, and (c) a separate UL TCI state. In some embodiments, each of the plurality of reference signals can be one of a downlink channel state information, CSI, reference signal, CSI-RS, and a uplink sounding reference signal, SRS. In some embodiments, the CSI-RS and the SRS can be periodic, aperiodic, or semi-persistent in time. In some embodiments, a reference signal configuration for a reference signal can be one of (a) a reference signal resource configuration for the reference signal; (b) a reference resource set configuration containing the reference signal resource; and (c) a configuration of an aperiodic CSI triggering state containing the reference signal resource. In some embodiments, the QCL information comprises information of a QCL source reference signal, wherein the QCL source reference signal indicates a spatial filter to be used by the WD for at least one of downlink reception and uplink transmission. In some embodiments, the first and the second unified TCI states are associated to a first and second spatial filter, respectively. In some embodiments, each of the plurality of reference signals is to be received or transmitted with one of the first and second spatial filters. In some embodiments, the processing circuitry is further configured to configure the WD by radio resource control, RRC, signaling. In some embodiments, the processing circuitry is further configured to configure the WD by a second medium access control, MAC, control element, CE, command. In some embodiments, the at least one of the activation command and the indication includes a first list of reference signals associated with the first unified TCI state, and a second list of reference signals associated with the second unified TCI state. In some embodiments, the at least one of the activation command and the indication includes a first list of reference signals associated with a first pointer pointing to the first unified TCI state, and a second list of reference signals associated with a second pointer pointing to the second unified TCI state. In some embodiments, the at least one of the activation command and the indication includes at least one reference signal pair, wherein the first reference signal in each reference signal pair is associated with the first unified TCI state, and the second reference signal in each reference signal pair is associated with the second unified TCI state. In some embodiments, the at least one of the activation command and the indication includes one or more channel measurement resource groups consisting of reference signals, wherein reference signals in a first set of channel measurement resource groups are associated with the first unified TCI state, and reference signals in a second set of channel measurement resource groups disjoint from the first set of channel measurement resource groups are associated with the second unified TCI state.

According to another aspect, a method in a network node configured to communicate with a wireless device, WD, includes sending at least one of an activation command and an indication for a first and a second unified transmission configuration indicator, TCI, state out of a plurality of unified TCI states, each of the first and second unified TCI states including quasi co-location, QCL, information for at least one of downlink reception and uplink transmission of a plurality of at least one of physical channels and reference signals by the WD. The method also includes associating each of a plurality of reference signals with one of the first and the second unified TCI states by one of: for each of the first and the second unified TCI states, configuring one or more associated reference signals out of the plurality of reference signals; and for each of the plurality of reference signals, including a pointer in a corresponding reference signal configuration, wherein the pointer pointing to one of the first and the second unified TCI states. The method also includes transmitting the associations of the plurality reference signals to the WD.

According to this aspect, in some embodiments, the activation command is a first medium access control, MAC, control element, CE, command to activate a subset of unified TCI states from the plurality of unified TCI states. In some embodiments, the indication is sent in downlink control information, DCI, format when there are more than two unified TCI states activated by the first MAC CE command. In some embodiments, each of the plurality of unified TCI states is one of (a) a joint downlink, DL, and an uplink, UL TCI state, (b) a DL TCI state, and (c) a separate UL TCI state. In some embodiments, each of the plurality of reference signals can be one of a downlink channel state information, CSI, reference signal, CSI-RS, and a uplink sounding reference signal, SRS. In some embodiments, the CSI-RS and the SRS can be periodic, aperiodic, or semi-persistent in time. In some embodiments, a reference signal configuration for a reference signal can be one of (a) a reference signal resource configuration for the reference signal; (b) a reference resource set configuration containing the reference signal resource; and (c) a configuration of an aperiodic CSI triggering state containing the reference signal resource. In some embodiments, the QCL information comprises information of a QCL source reference signal, wherein the QCL source reference signal indicates a spatial filter to be used by the WD for at least one of downlink reception and uplink transmission. In some embodiments, the first and the second unified TCI states are associated to a first and second spatial filter, respectively. In some embodiments, each of the plurality of reference signals is to be received or transmitted with one of the first and second spatial filters. In some embodiments, the method includes configuring the WD by radio resource control, RRC, signaling. In some embodiments, the method includes configuring the WD by a second medium access control, MAC, control element, CE, command. In some embodiments, the at least one of the activation command and the indication includes a first list of reference signals associated with the first unified TCI state, and a second list of reference signals associated with the second unified TCI state. In some embodiments, the at least one of the activation command and the indication includes a first list of reference signals associated with a first pointer pointing to the first unified TCI state, and a second list of reference signals associated with a second pointer pointing to the second unified TCI state. In some embodiments, the at least one of the activation command and the indication includes at least one reference signal pair, wherein the first reference signal in each reference signal pair is associated with the first unified TCI state, and the second reference signal in each reference signal pair is associated with the second unified TCI state. In some embodiments, the at least one of the activation command and the indication includes one or more channel measurement resource groups consisting of reference signals, wherein reference signals in a first set of channel measurement resource groups are associated with the first unified TCI state, and reference signals in a second set of channel measurement resource groups disjoint from the first set of channel measurement resource groups are associated with the second unified TCI state.

According to yet another aspect, a WD configured to communicate with a network node, includes a radio interface configured to: receive at least one of an activation command and an indication for a first and second unified transmission configuration indicator, TCI state our of a plurality of unified TCI states, each of the first and second unified TCI states including quasi co-location, QCL, information for at least one of downlink reception and uplink transmission of a plurality of at least one of physical channels and reference signals by the WD. The radio interface is also configured to receive an association of each of a plurality of references signals with one of the first and second unified TCI states.

According to this aspect, in some embodiments, the activation command is a first medium access control, MAC, control element, CE, command to activate a subset of unified TCI states from the plurality of unified TCI states. In some embodiments, the indication is sent in downlink control information, DCI, format when there are more than two unified TCI states activated by the first MAC CE command. In some embodiments, each of the plurality of unified TCI states is one of (a) a joint downlink, DL, and an uplink, UL TCI state, (b) a DL TCI state, and (c) a separate UL TCI state. In some embodiments, each of the plurality of reference signals can be one of a downlink channel state information, CSI, reference signal, CSI-RS, and a uplink sounding reference signal, SRS. In some embodiments, the CSI-RS and the SRS can be periodic, aperiodic, or semi-persistent in time. In some embodiments, a reference signal configuration for a reference signal can be one of (a) a reference signal resource configuration for the reference signal; (b) a reference resource set configuration containing the reference signal resource; and (c) a configuration of an aperiodic CSI triggering state containing the reference signal resource. In some embodiments, the QCL information comprises information of a QCL source reference signal, wherein the QCL source reference signal indicates a spatial filter to be used by the WD for at least one of downlink reception and uplink transmission. In some embodiments, the first and the second unified TCI states are associated to a first and second spatial filter, respectively. In some embodiments, each of the plurality of reference signals is to be received or transmitted with one of the first and second spatial filters. In some embodiments, the at least one of the activation command and the indication includes a first list of reference signals associated with the first unified TCI state, and a second list of reference signals associated with the second unified TCI state. In some embodiments, the at least one of the activation command and the indication includes a first list of reference signals associated with a first pointer pointing to the first unified TCI state, and a second list of reference signals associated with a second pointer pointing to the second unified TCI state. In some embodiments, the at least one of the activation command and the indication includes at least one reference signal pair, wherein the first reference signal in each reference signal pair is associated with the first unified TCI state, and the second reference signal in each reference signal pair is associated with the second unified TCI state. In some embodiments, the at least one of the activation command and the indication includes one or more channel measurement resource groups consisting of reference signals, wherein reference signals in a first set of channel measurement resource groups are associated with the first unified TCI state, and reference signals in a second set of channel measurement resource groups disjoint from the first set of channel measurement resource groups are associated with the second unified TCI state.

According to another aspect, a method in a wireless device to communicate with a network node includes receiving at least one of an activation command and an indication for a first and second unified transmission configuration indicator, TCI state our of a plurality of unified TCI states, each of the first and second unified TCI states including quasi co-location, QCL, information for at least one of downlink reception and uplink transmission of a plurality of at least one of physical channels and reference signals by the WD. The method also includes receiving an association of each of a plurality of references signals with one of the first and second unified TCI states.

According to this aspect, in some embodiments, the activation command is a first medium access control, MAC, control element, CE, command to activate a subset of unified TCI states from the plurality of unified TCI states. In some embodiments, the indication is sent in downlink control information, DCI, format when there are more than two unified TCI states activated by the first MAC CE command. In some embodiments, each of the plurality of unified TCI states is one of (a) a joint downlink, DL, and an uplink, UL TCI state, (b) a DL TCI state, and (c) a separate UL TCI state. In some embodiments, each of the plurality of reference signals can be one of a downlink channel state information, CSI, reference signal, CSI-RS, and a uplink sounding reference signal, SRS. In some embodiments, the CSI-RS and the SRS can be periodic, aperiodic, or semi-persistent in time. In some embodiments, a reference signal configuration for a reference signal can be one of (a) a reference signal resource configuration for the reference signal; (b) a reference resource set configuration containing the reference signal resource; and (c) a configuration of an aperiodic CSI triggering state containing the reference signal resource. In some embodiments, the QCL information comprises information of a QCL source reference signal, wherein the QCL source reference signal indicates a spatial filter to be used by the WD for at least one of downlink reception and uplink transmission. In some embodiments, the first and the second unified TCI states are associated to a first and second spatial filter, respectively. In some embodiments, each of the plurality of reference signals is to be received or transmitted with one of the first and second spatial filters. In some embodiments, the at least one of the activation command and the indication includes a first list of reference signals associated with the first unified TCI state, and a second list of reference signals associated with the second unified TCI state. In some embodiments, the at least one of the activation command and the indication includes a first list of reference signals associated with a first pointer pointing to the first unified TCI state, and a second list of reference signals associated with a second pointer pointing to the second unified TCI state. In some embodiments, the at least one of the activation command and the indication includes at least one reference signal pair, wherein the first reference signal in each reference signal pair is associated with the first unified TCI state, and the second reference signal in each reference signal pair is associated with the second unified TCI state. In some embodiments, the at least one of the activation command and the indication includes one or more channel measurement resource groups consisting of reference signals, wherein reference signals in a first set of channel measurement resource groups are associated with the first unified TCI state, and reference signals in a second set of channel measurement resource groups disjoint from the first set of channel measurement resource groups are associated with the second unified TCI state.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 22 is a first example of activated TCI states;

FIG. 23 is second example of activated TCI states;

FIG. 24 is a third example of activated TCI states;

FIG. 25 is a fourth example of activated TCI states;

FIG. 26 is a fifth example of activated TCI states;

FIG. 27 is an example of a first information element; and

FIG. 28 is an example of a second information element.

DETAILED DESCRIPTION

Figure 1:
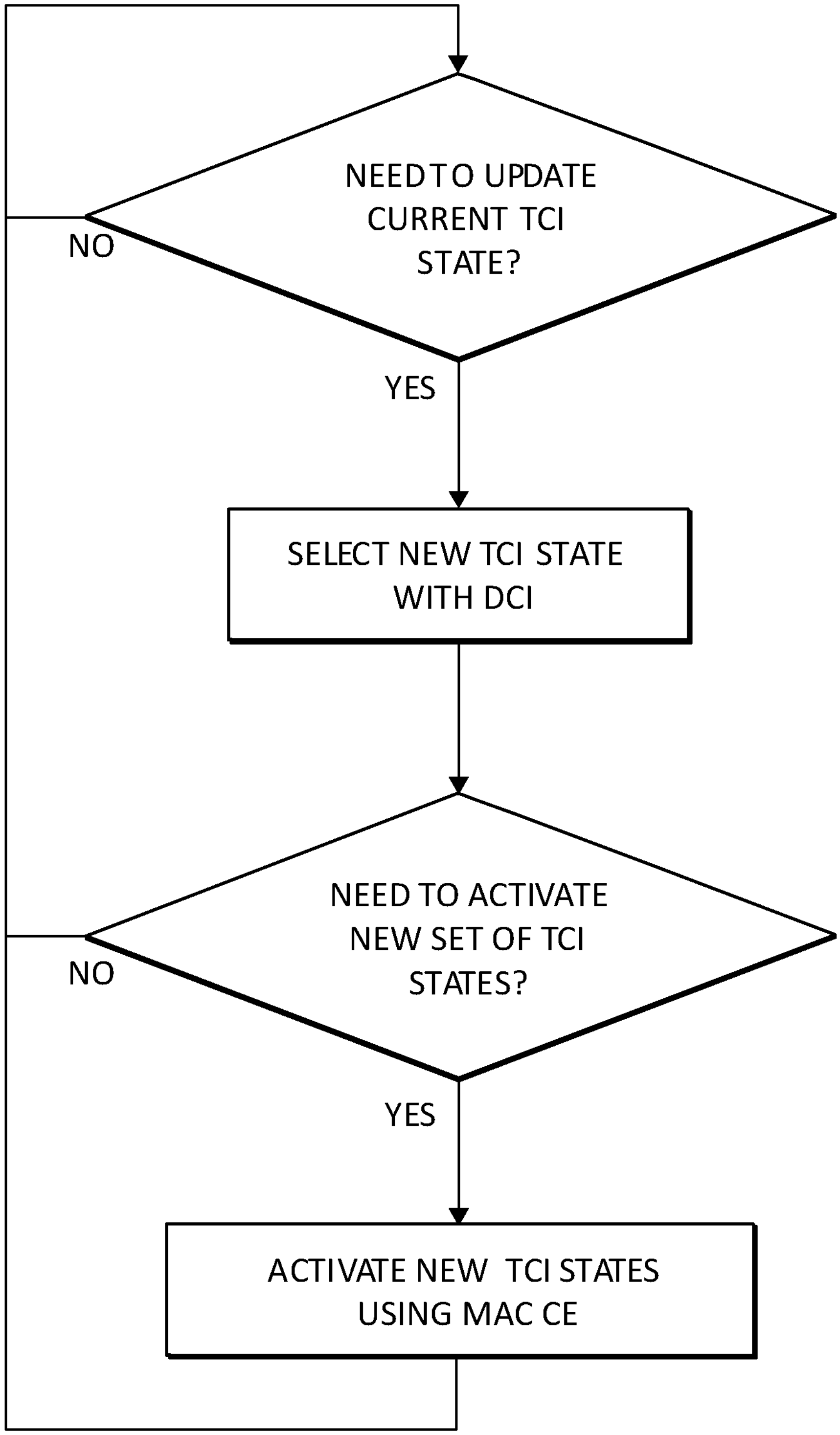
FIG. 1 is a flowchart of an example process for two-stage TCI state updates.
Figure 2:
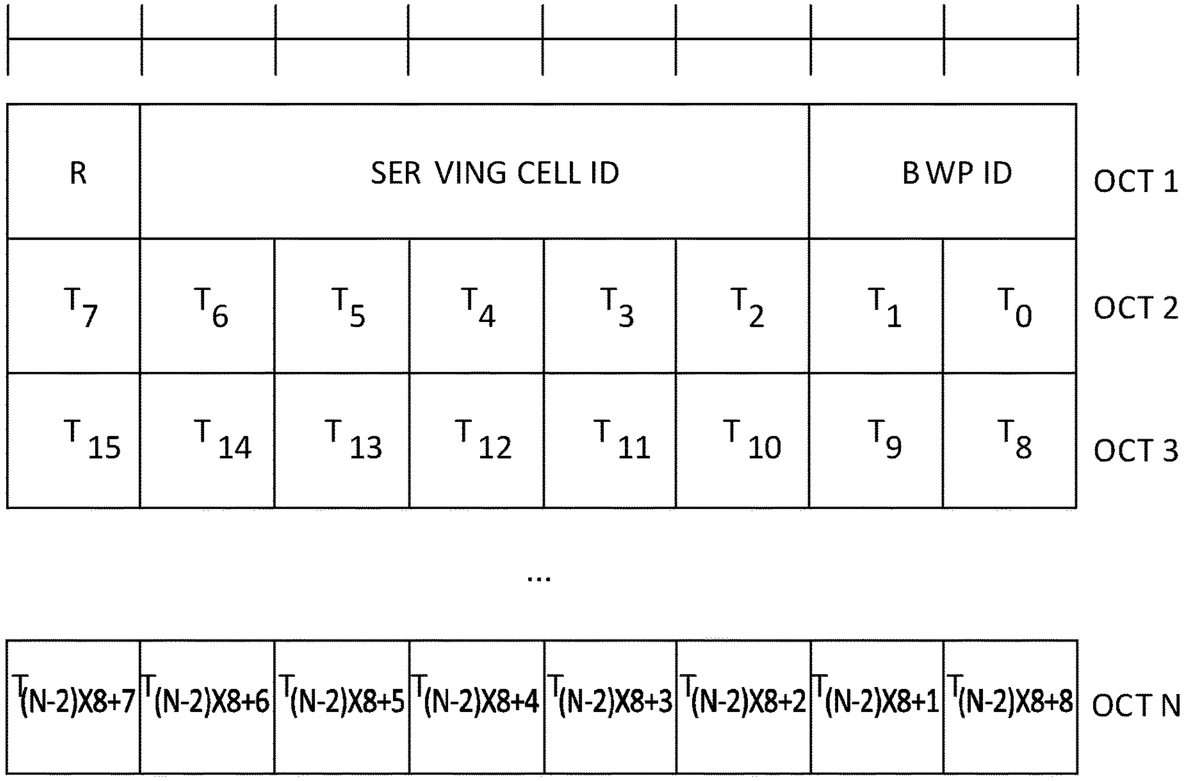
FIG. 2 illustrates TCI states activation/deactivation.
Figure 3:
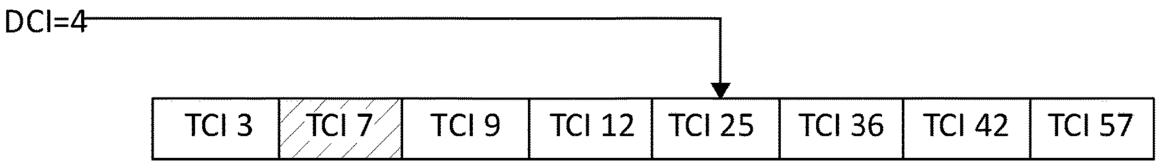
FIG. 3 is an example of DCI indication of a TCI state.
Figure 4:
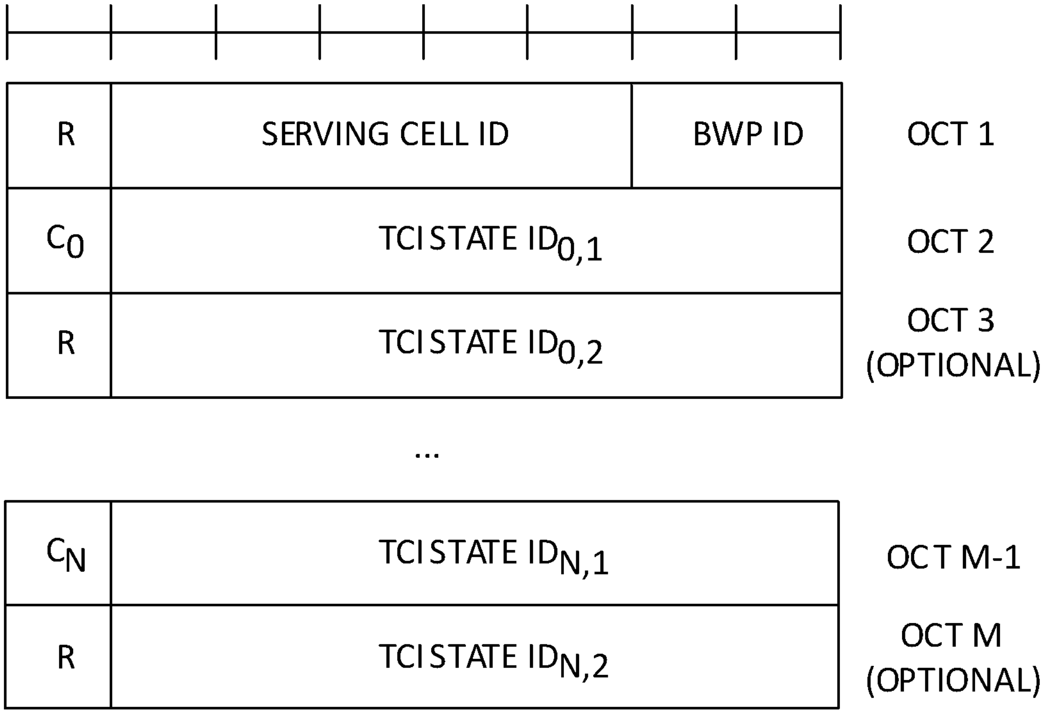
FIG. 4 is an example of enhanced TCI states.
Figure 5:
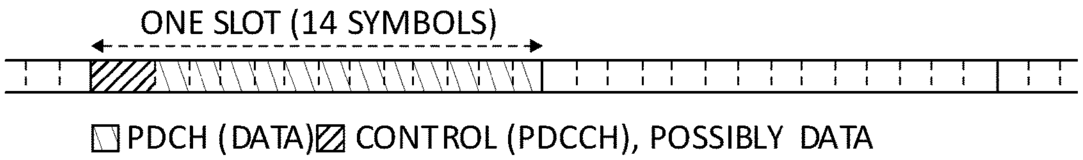
FIG. 5 illustrates a NR time-domain structure.
Figure 6:
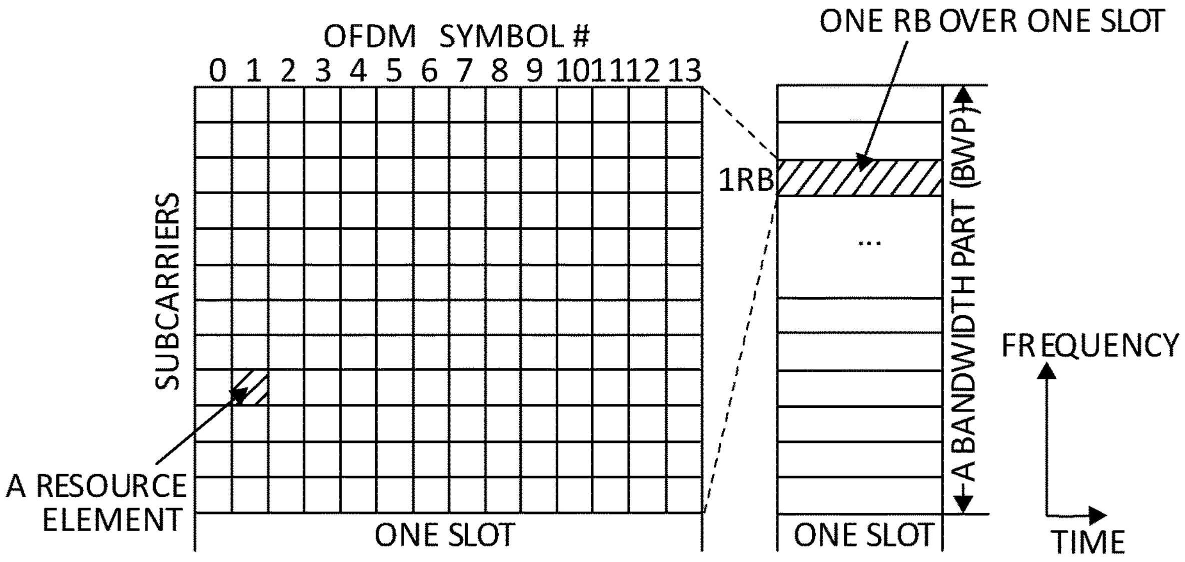
FIG. 6 illustrates an NR resource grid.
Figure 7:
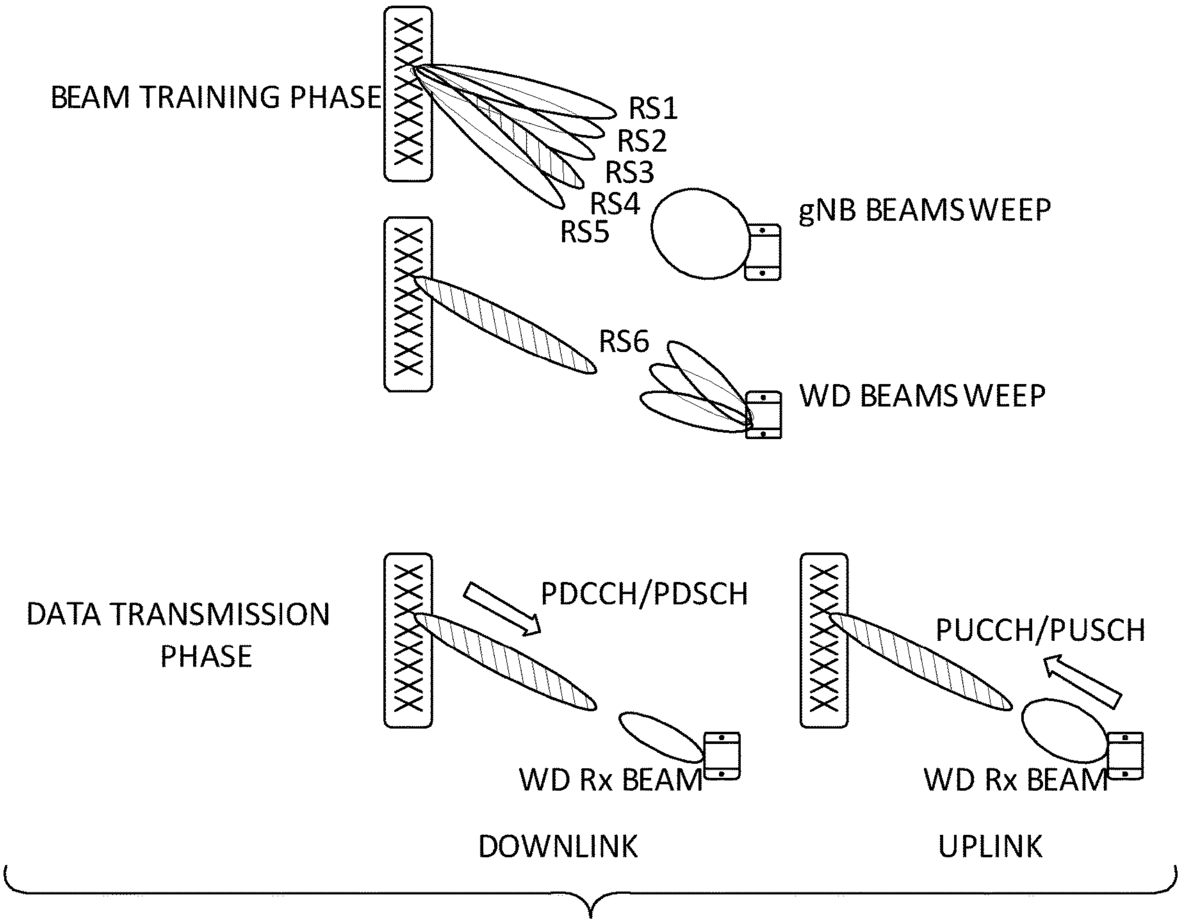
FIG. 7 illustrates beam training.
Figure 8:
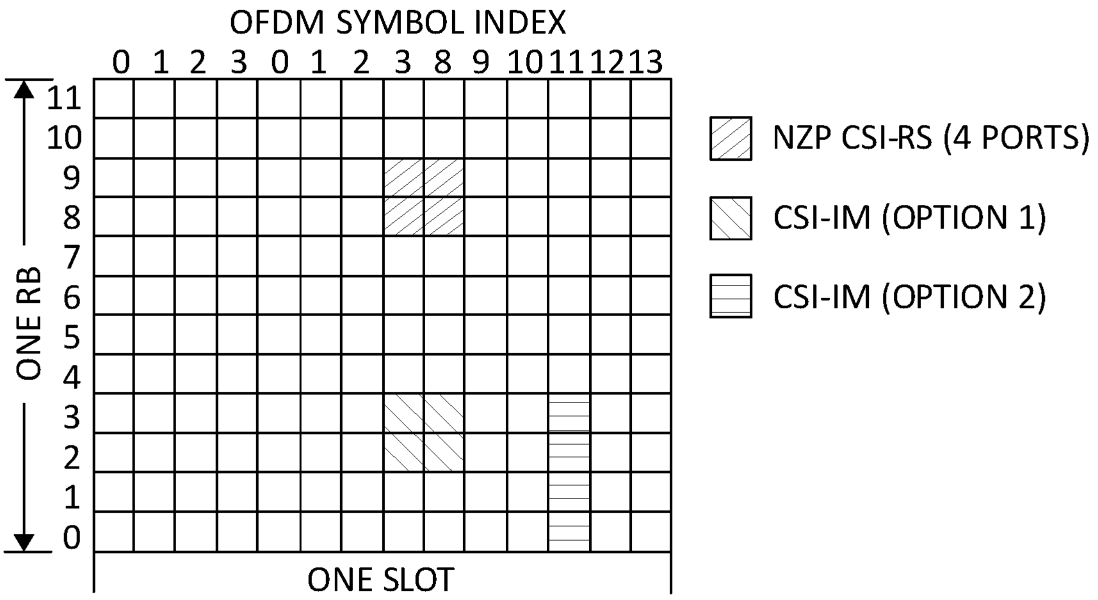
FIG. 8 illustrate a resource element allocation.
Figure 9:
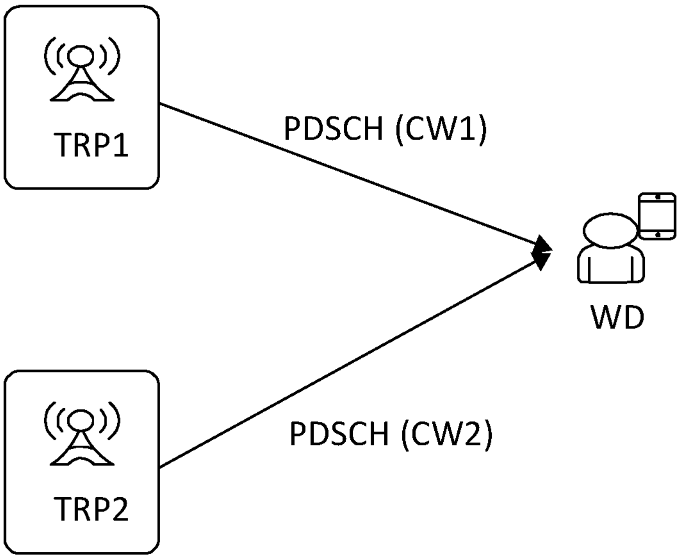
FIG. 9 illustrates an example of NC-JT supported in LTE.
Figure 10:
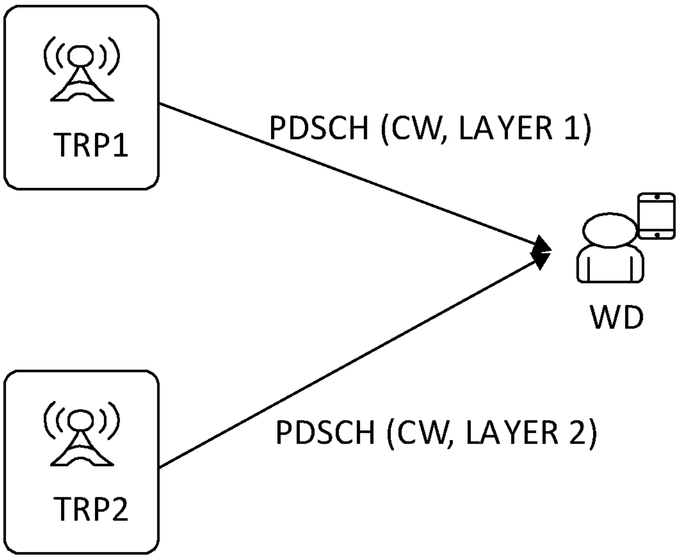
FIG. 10 illustrates an example of NC-JT supported in NR.

Before describing in detail example embodiments, it is noted that the embodiments reside primarily in combinations of apparatus components and processing steps related to common spatial filter indications for reference signals in multiple transmission reception point (TRP) systems. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising." "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide common spatial filter indication for reference signals in multiple transmission reception point (TRP) systems.

Some embodiments extend a unified TCI framework to handle reference signal reception in single DCI-based, multi-TRP operation.

Figure 11:
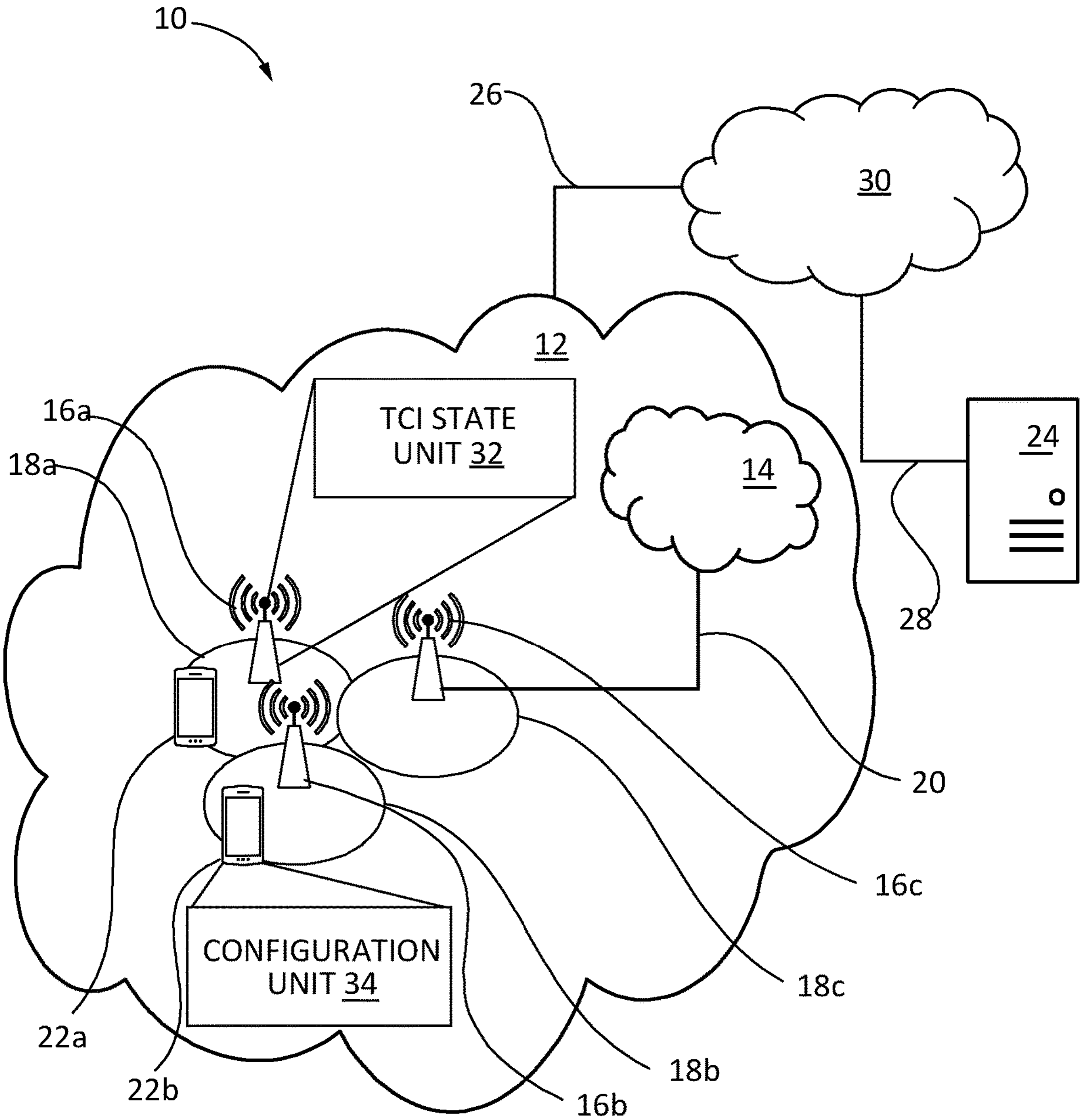
FIG. 11 is a schematic diagram of an example network architecture illustrating a communication system connected via an intermediate network to a host computer according to the principles in the present disclosure.

Referring again to the drawing figures, in which like elements are referred to by like reference numerals, there is shown in FIG. 11 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

Figure 12:
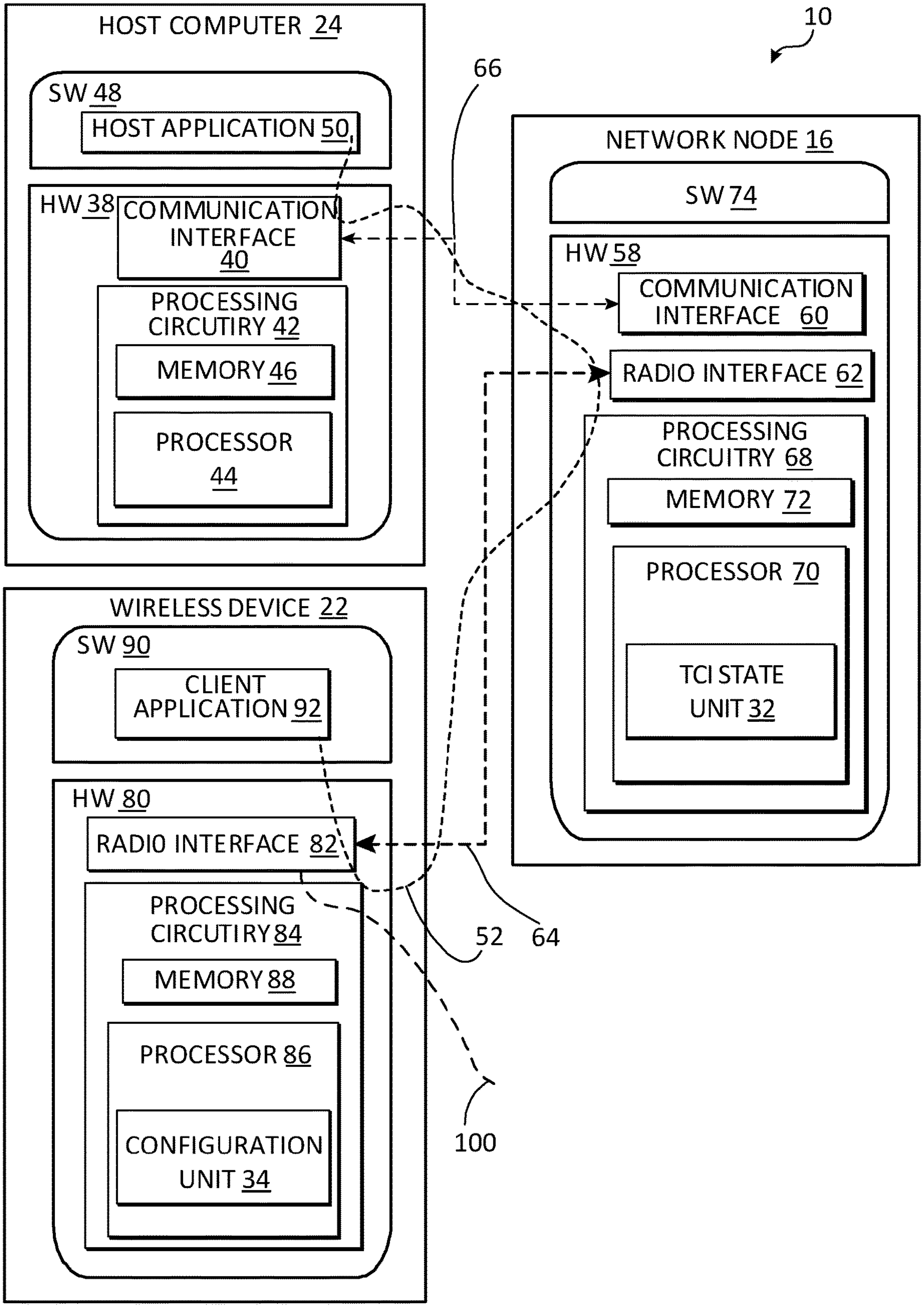
FIG. 12 is a block diagram of a host computer communicating via a network node with a wireless device over an at least partially wireless connection according to some embodiments of the present disclosure.

The communication system of FIG. 12 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a TCI state unit 32 configured to send at least one of an activation command and an indication for a first and a second unified transmission configuration indicator, TCI, state out of a plurality of unified TCI states, each of the first and second unified TCI states including quasi co-location, QCL, information for at least one of downlink reception and uplink transmission of a plurality of at least one of physical channels and reference signals by the WD. The TCI state unit may also be configured to associate a reference signal set of a plurality of reference signal sets with a beam index. The TCI state unit 32 may also be configured to configure the WD with a plurality of common beam indices, each common beam index corresponding to a set of reference signals. A wireless device 22 is configured to include a configuration unit 34 which is configured to determine a spatial filter corresponding to a reference signal set based at least in part on the beam index. The configuration unit 34 may also be configured to override a received TCI state configuration by a TCI state configuration applied to a common beam index. The configuration unit 34 may also be configured to override a TCI state configuration by a TCI state configuration applied to a common beam index by a received TCI state configuration.

Example implementations, in accordance with an embodiment, of the WD 22, network node 16 and host computer 24 discussed in the preceding paragraphs will now be described with reference to FIG. 12. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a TCI state unit 32 configured to send at least one of an activation command and an indication for a first and a second unified transmission configuration indicator, TCI, state out of a plurality of unified TCI states, each of the first and second unified TCI states including quasi co-location, QCL, information for at least one of downlink reception and uplink transmission of a plurality of at least one of physical channels and reference signals by the WD. The TCI state unit may also be configured to associate a reference signal set of a plurality of reference signal sets with a beam index. The TCI state unit 32 may also be configured to configure the WD with a plurality of common beam indices, each common beam index corresponding to a set of reference signals.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers. The radio interface 82 is configured to receive at least one of an activation command and an indication for a first and second unified transmission configuration indicator, TCI state our of a plurality of unified TCI states, each of the first and second unified TCI states including quasi co-location, QCL, information for at least one of downlink reception and uplink transmission of a plurality of at least one of physical channels and reference signals by the WD. The radio interface 82 is also configured to receive an association of each of a plurality of references signals with one of the first and second unified TCI states.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control. e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a configuration unit 34 which is configured to determine a spatial filter corresponding to a reference signal set based at least in part on the beam index. The configuration unit 34 may also be configured to override a received TCI state configuration by a TCI state configuration applied to a common beam index. In some embodiments, the configuration unit 34 is configured to override a TCI state configuration by a TCI state configuration applied to a common beam index by a received TCI state configuration.

In some embodiments, the inner workings of the network node 16, WD 22, and host computer 24 may be as shown in FIG. 12 and independently, the surrounding network topology may be that of FIG. 11.

In FIG. 12, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which may be hidden from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 11 and 12 show various "units" such as TCI state unit 32, and configuration unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 13:
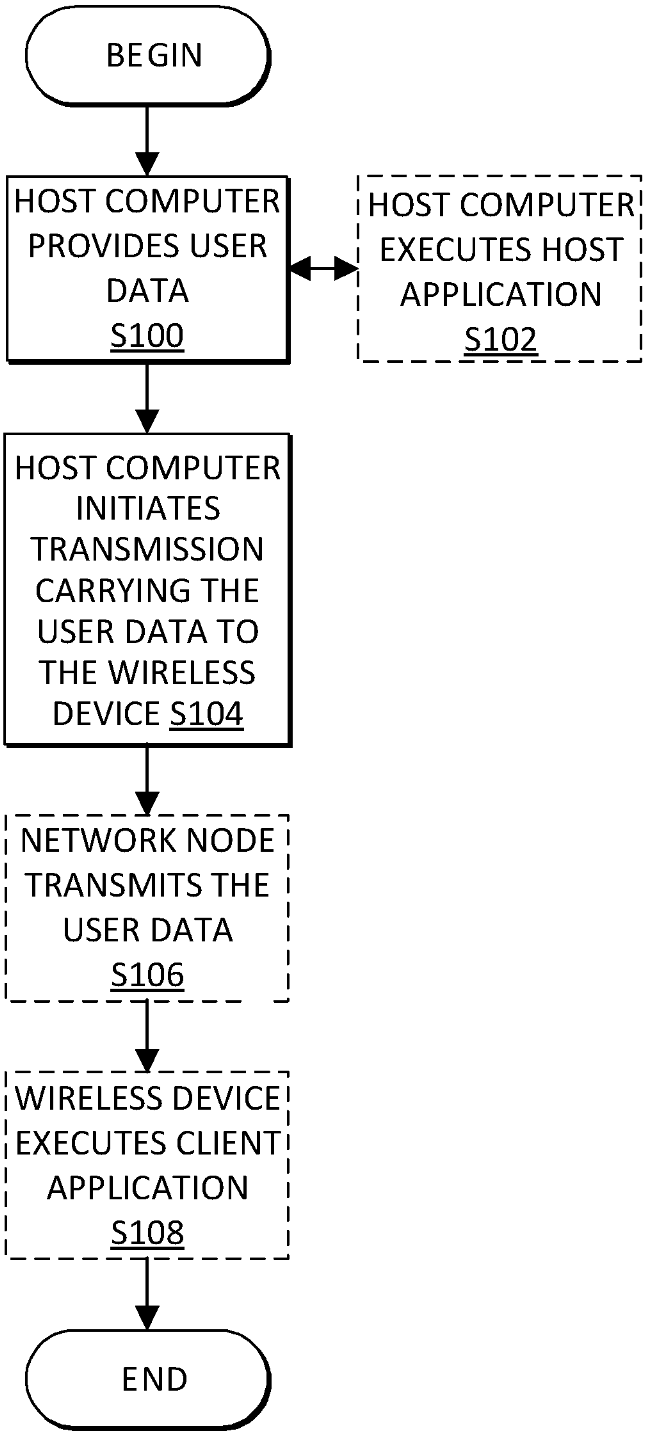
FIG. 13 is a flowchart illustrating example methods implemented in a communication system including a host computer, a network node and a wireless device for executing a client application at a wireless device according to some embodiments of the present disclosure.

FIG. 13 is a flowchart illustrating an example method implemented in a communication system, such as, for example, the communication system of FIGS. 11 and 12, in accordance with one embodiment. The communication system may include a host computer 24, a network node 16 and a WD 22, which may be those described with reference to FIG. 12. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 14:
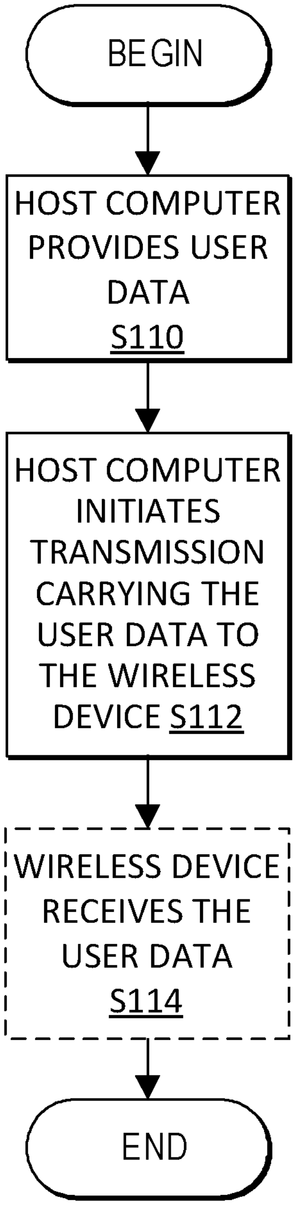
FIG. 14 is a flowchart illustrating example methods implemented in a communication system including a host computer, a network node and a wireless device for receiving user data at a wireless device according to some embodiments of the present disclosure.

FIG. 14 is a flowchart illustrating an example method implemented in a communication system, such as, for example, the communication system of FIG. 11, in accordance with one embodiment. The communication system may include a host computer 24, a network node 16 and a WD 22, which may be those described with reference to FIGS. 11 and 12. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 15:
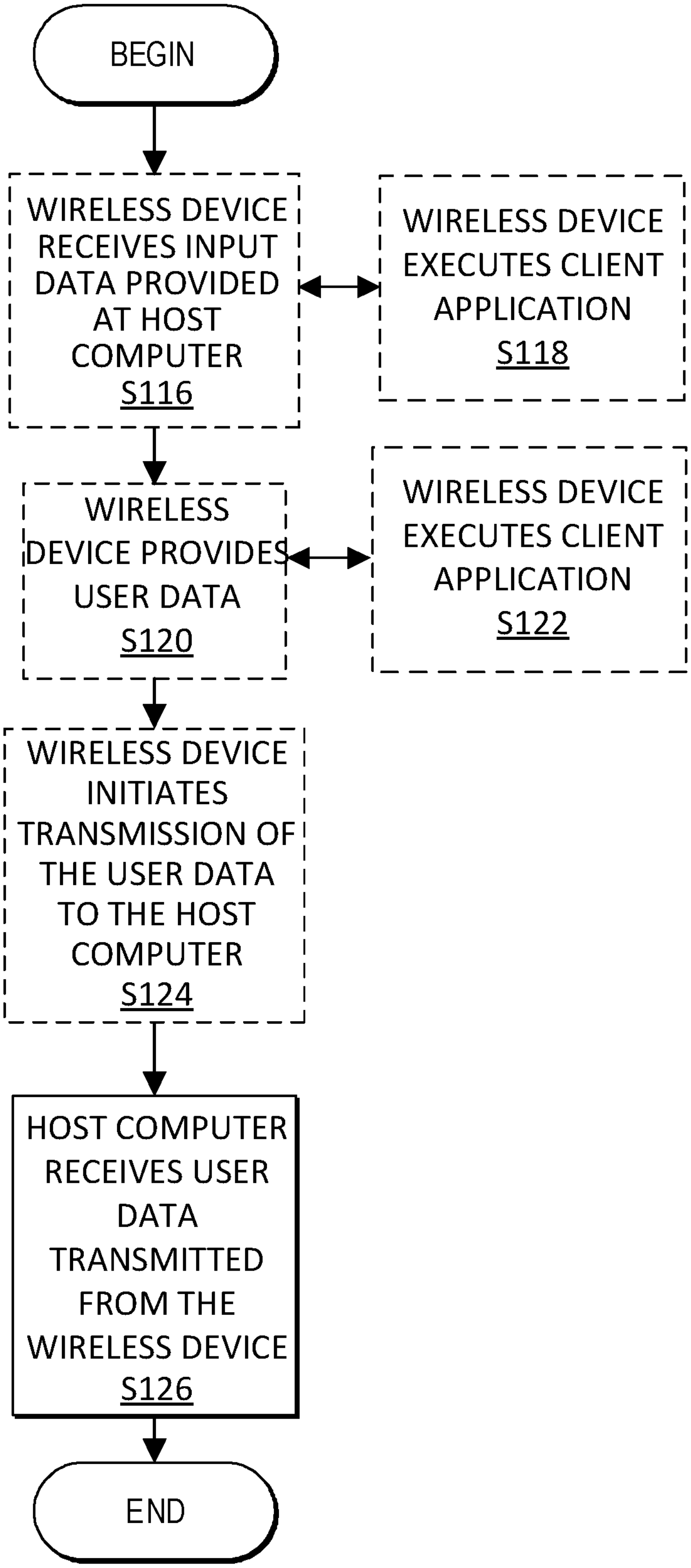
FIG. 15 is a flowchart illustrating example methods implemented in a communication system including a host computer, a network node and a wireless device for receiving user data from the wireless device at a host computer according to some embodiments of the present disclosure.

FIG. 15 is a flowchart illustrating an example method implemented in a communication system, such as, for example, the communication system of FIG. 11, in accordance with one embodiment. The communication system may include a host computer 24, a network node 16 and a WD 22, which may be those described with reference to FIGS. 11 and 12. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 16:
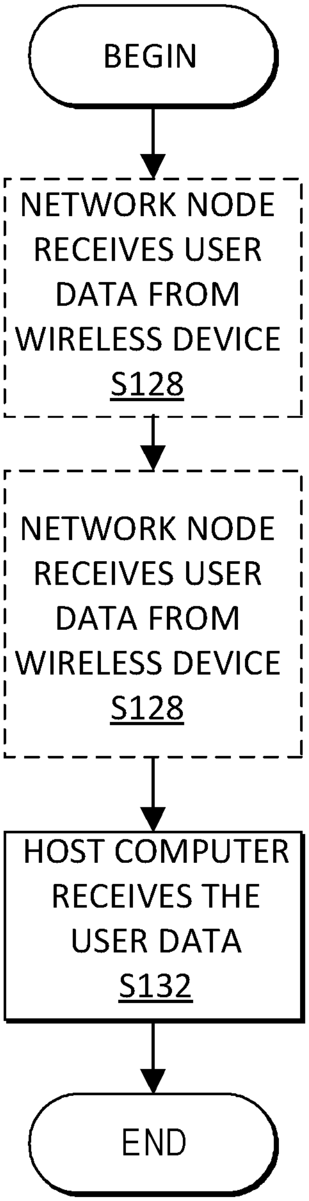
FIG. 16 is a flowchart illustrating example methods implemented in a communication system including a host computer, a network node and a wireless device for receiving user data at a host computer according to some embodiments of the present disclosure.

FIG. 16 is a flowchart illustrating an example method implemented in a communication system, such as, for example, the communication system of FIG. 11, in accordance with one embodiment. The communication system may include a host computer 24, a network node 16 and a WD 22, which may be those described with reference to FIGS. 11 and 12. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 17:
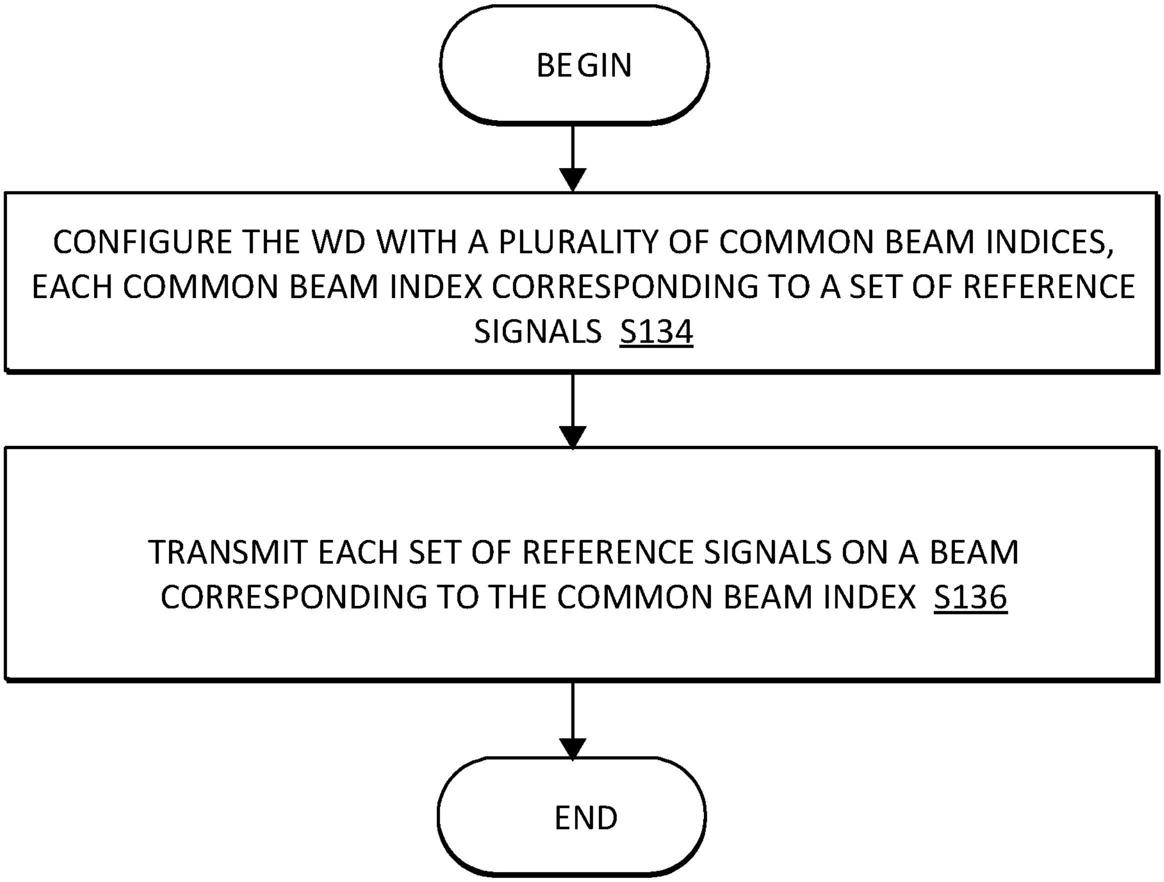
FIG. 17 is a flowchart of an example process in a network node for common spatial filter indications for reference signals in multiple transmission reception point (TRP) systems.

FIG. 17 is a flowchart of an example process in a network node 16 for common spatial filter indications for reference signals in multiple transmission point (TRP) systems. One or more blocks described herein may be performed by one or more elements of network node 16 such as by one or more of processing circuitry 68 (including the TCI state unit 32), processor 70, radio interface 62 and/or communication interface 60. Network node 16 is configured to configure the WD with a plurality of common beam indices, each common beam index corresponding to a set of reference signals (Block S134). The process also includes transmitting each set of reference signals on a beam corresponding to the common beam index (Block S136).

Figure 18:
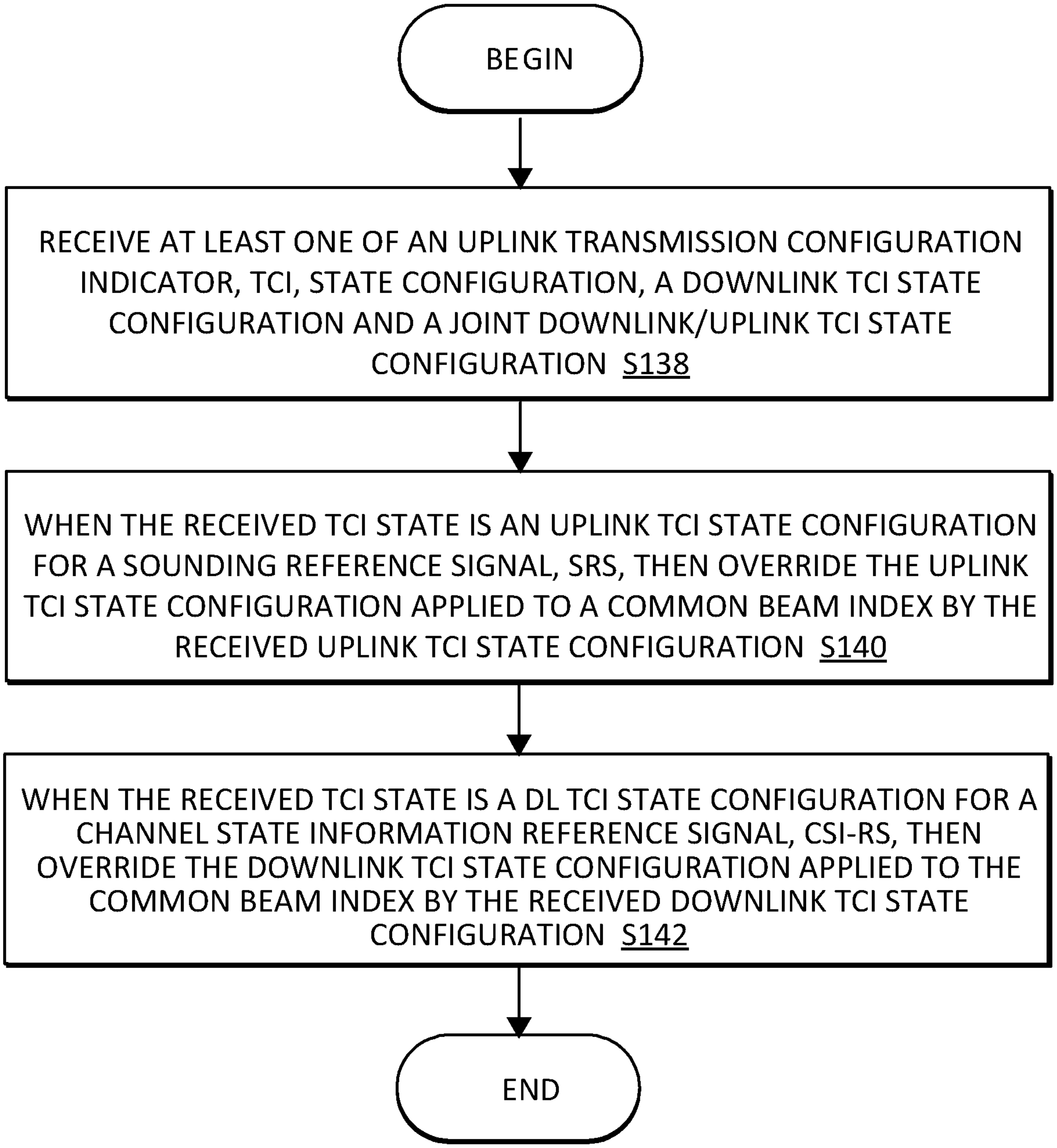
FIG. 18 is a flowchart of an example process in a wireless device for common spatial filter indications for reference signals in multiple transmission reception point (TRP) systems.

FIG. 18 is a flowchart of an example process in a wireless device 22 according to some embodiments of the present disclosure. One or more blocks described herein may be performed by one or more elements of wireless device 22 such as by one or more of processing circuitry 84 (including the configuration unit 34), processor 86, radio interface 82 and/or communication interface 60. Wireless device 22 such as via processing circuitry 84 and/or processor 86 and/or radio interface 82 is configured to receive at least one of an uplink transmission configuration indicator, TCI, state configuration, a downlink TCI state configuration and a joint downlink/uplink TCI state configuration (Block S138). The process also includes, when the received TCI state is an uplink TCI state configuration for a sounding reference signal, SRS, then overriding the received uplink TCI state configuration applied to a common beam index (Block S140). The process also includes, when the received TCI state is a DL TCI state configuration for a channel state information reference signal, CSI-RS, then overriding the received downlink TCI state configuration applied to the common beam index (Block S142).

Figure 19:
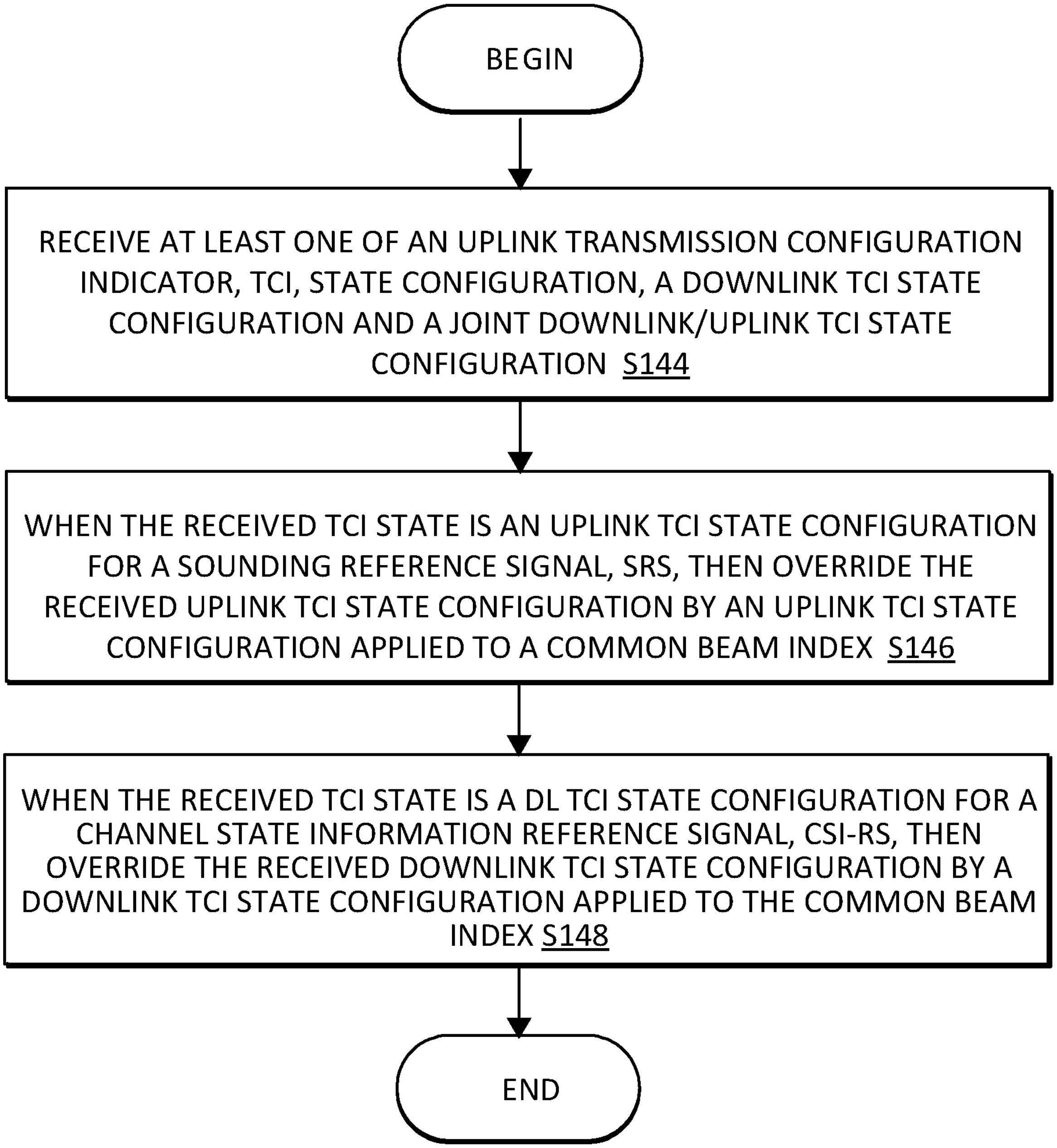
FIG. 19 is a flowchart of another example process in a wireless device for common spatial filter indications for reference signals in multiple transmission reception point (TRP) systems.

FIG. 19 is a flowchart of another example process in a wireless device 22 according to some embodiments of the present disclosure. One or more blocks described herein may be performed by one or more elements of wireless device 22 such as by one or more of processing circuitry 84 (including the configuration unit 34), processor 86, radio interface 82 and/or communication interface 60. Wireless device 22 such as via processing circuitry 84 and/or processor 86 and/or radio interface 82 is configured to receive at least one of an uplink transmission configuration indicator. TCI, state configuration, a downlink TCI state configuration and a joint downlink/uplink TCI state configuration (Block S144). The process also includes, when the received TCI state is an uplink TCI state configuration for a sounding reference signal, SRS, then overriding the received uplink TCI state configuration by an uplink TCI state configuration applied to a common beam index (Block S146). The process also includes, when the received TCI state is a DL TCI state configuration for a channel state information reference signal, CSI-RS, then overriding the received downlink TCI state configuration by a downlink TCI state configuration applied to the common beam index (Block S148).

Figure 20:
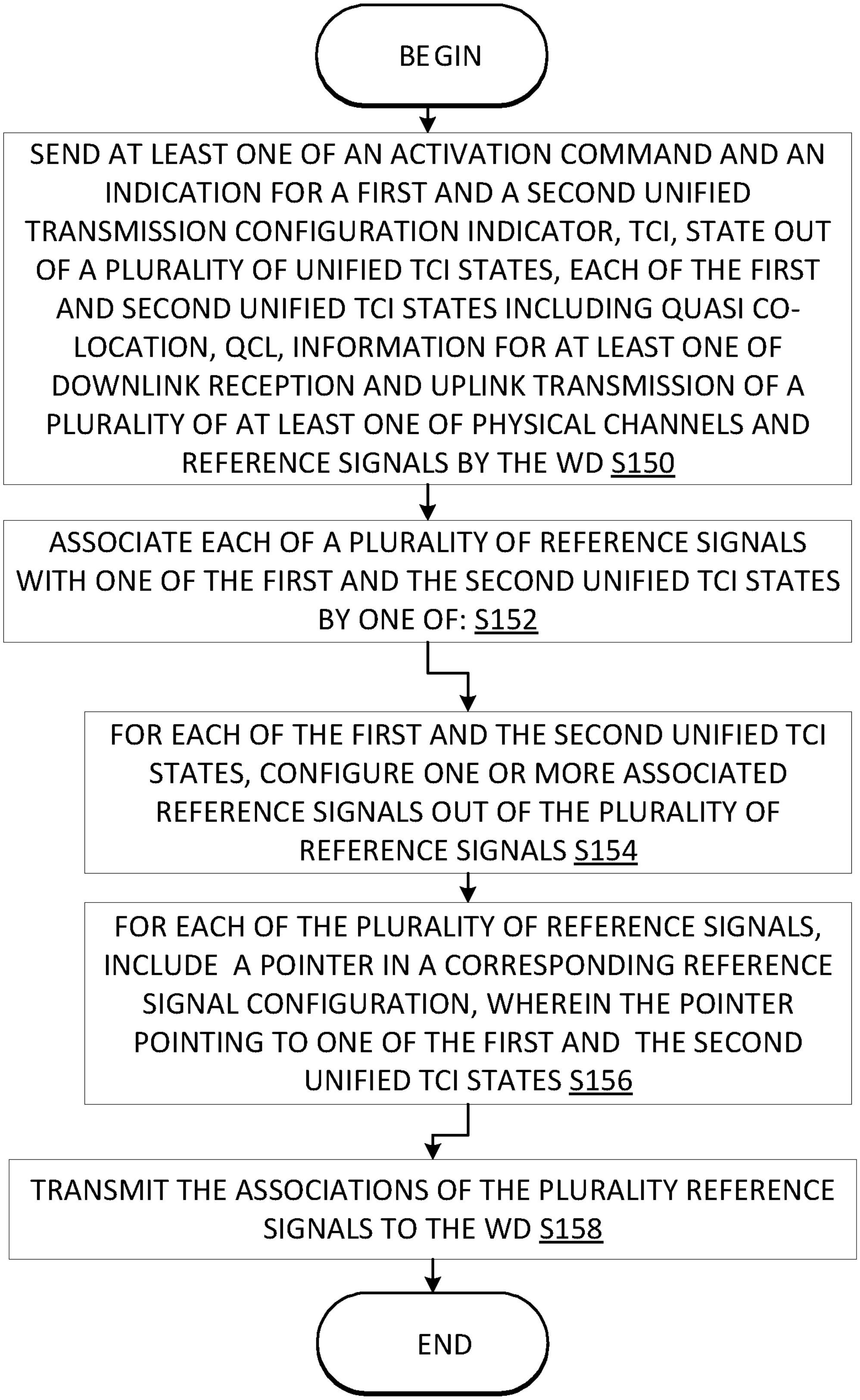
FIG. 20 is a flowchart of another example process in a network node for common spatial filter indications for reference signals in multiple transmission reception point (TRP) systems.

FIG. 20 is a flowchart of an example process in a network node 16 for common spatial filter indications for reference signals in multiple transmission point (TRP) systems. One or more blocks described herein may be performed by one or more elements of network node 16 such as by one or more of processing circuitry 68 (including the TCI state unit 32), processor 70, radio interface 62 and/or communication interface 60. Network node 16 is configured to send at least one of an activation command and an indication for a first and a second unified transmission configuration indicator, TCI, state out of a plurality of unified TCI states, each of the first and second unified TCI states including quasi co-location, QCL, information for at least one of downlink reception and uplink transmission of a plurality of at least one of physical channels and reference signals by the WD (Block S150). The method also includes associating each of a plurality of reference signals with one of the first and the second unified TCI states by one of (Block S152): for each of the first and the second unified TCI states, configuring one or more associated reference signals out of the plurality of reference signals (Block S154); and for each of the plurality of reference signals, including a pointer in a corresponding reference signal configuration, wherein the pointer pointing to one of the first and the second unified TCI states (Block S156). The method also includes transmitting the associations of the plurality reference signals to the WD (Block S158).

According to this aspect, in some embodiments, the activation command is a first medium access control, MAC, control element, CE, command to activate a subset of unified TCI states from the plurality of unified TCI states. In some embodiments, the indication is sent in downlink control information, DCI, format when there are more than two unified TCI states activated by the first MAC CE command. In some embodiments, each of the plurality of unified TCI states is one of (a) a joint downlink, DL, and an uplink, UL TCI state, (b) a DL TCI state, and (c) a separate UL TCI state. In some embodiments, each of the plurality of reference signals can be one of a downlink channel state information, CSI, reference signal, CSI-RS, and a uplink sounding reference signal, SRS. In some embodiments, the CSI-RS and the SRS can be periodic, aperiodic, or semi-persistent in time. In some embodiments, a reference signal configuration for a reference signal can be one of (a) a reference signal resource configuration for the reference signal; (b) a reference resource set configuration containing the reference signal resource; and (c) a configuration of an aperiodic CSI triggering state containing the reference signal resource. In some embodiments, the QCL information comprises information of a QCL source reference signal, wherein the QCL source reference signal indicates a spatial filter to be used by the WD for at least one of downlink reception and uplink transmission. In some embodiments, the first and the second unified TCI states are associated to a first and second spatial filter, respectively. In some embodiments, each of the plurality of reference signals is to be received or transmitted with one of the first and second spatial filters. In some embodiments, the method includes configuring the WD (W22) by radio resource control, RRC, signaling. In some embodiments, the method includes configuring the WD (22) by a second medium access control, MAC, control element, CE, command. In some embodiments, the at least one of the activation command and the indication includes a first list of reference signals associated with the first unified TCI state, and a second list of reference signals associated with the second unified TCI state. In some embodiments, the at least one of the activation command and the indication includes a first list of reference signals associated with a first pointer pointing to the first unified TCI state, and a second list of reference signals associated with a second pointer pointing to the second unified TCI state. In some embodiments, the at least one of the activation command and the indication includes at least one reference signal pair, wherein the first reference signal in each reference signal pair is associated with the first unified TCI state, and the second reference signal in each reference signal pair is associated with the second unified TCI state. In some embodiments, the at least one of the activation command and the indication includes one or more channel measurement resource groups consisting of reference signals, wherein reference signals in a first set of channel measurement resource groups are associated with the first unified TCI state, and reference signals in a second set of channel measurement resource groups disjoint from the first set of channel measurement resource groups are associated with the second unified TCI state.

Figure 21:
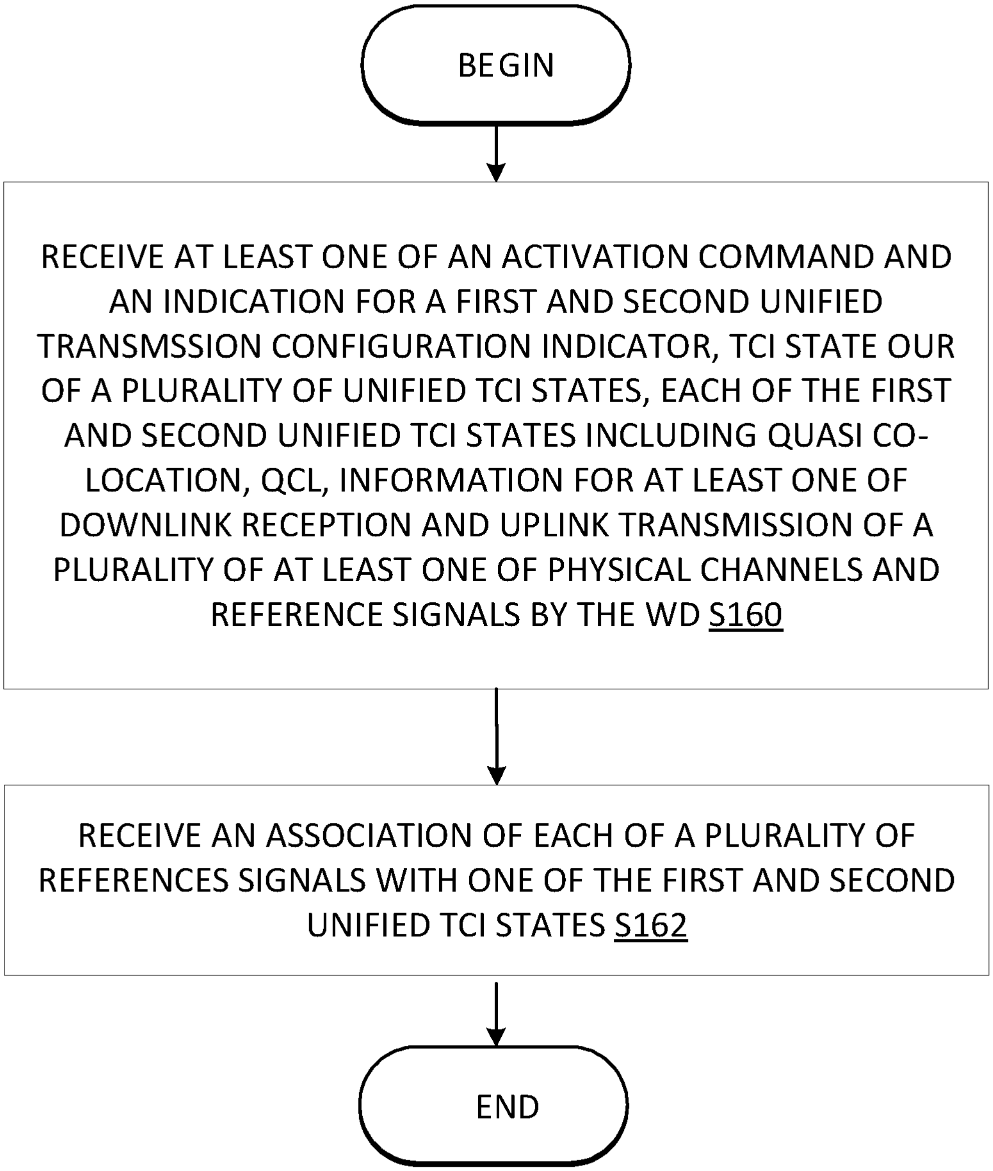
FIG. 21 is a flowchart of an example process in a wireless device for common spatial filter indications for reference signals in multiple transmission reception point (TRP) systems.

FIG. 21 is a flowchart of an example process in a wireless device 22 according to some embodiments of the present disclosure. One or more blocks described herein may be performed by one or more elements of wireless device 22 such as by one or more of processing circuitry 84 (including the configuration unit 34), processor 86, radio interface 82 and/or communication interface 60. Wireless device 22 such as via processing circuitry 84 and/or processor 86 and/or radio interface 82 is configured to receive at least one of an activation command and an indication for a first and second unified transmission configuration indicator, TCI state our of a plurality of unified TCI states, each of the first and second unified TCI states including quasi co-location, QCL, information for at least one of downlink reception and uplink transmission of a plurality of at least one of physical channels and reference signals by the WD (Block S160). The method also includes receiving an association of each of a plurality of references signals with one of the first and second unified TCI states (Block S162).

According to this aspect, in some embodiments, the activation command is a first medium access control, MAC, control element, CE, command to activate a subset of unified TCI states from the plurality of unified TCI states. In some embodiments, the indication is sent in downlink control information, DCI, format when there are more than two unified TCI states activated by the first MAC CE command. In some embodiments, each of the plurality of unified TCI states is one of (a) a joint downlink, DL, and an uplink, UL TCI state, (b) a DL TCI state, and (c) a separate UL TCI state. In some embodiments, each of the plurality of reference signals can be one of a downlink channel state information, CSI, reference signal, CSI-RS, and a uplink sounding reference signal, SRS. In some embodiments, the CSI-RS and the SRS can be periodic, aperiodic, or semi-persistent in time. In some embodiments, a reference signal configuration for a reference signal can be one of (a) a reference signal resource configuration for the reference signal; (b) a reference resource set configuration containing the reference signal resource; and (c) a configuration of an aperiodic CSI triggering state containing the reference signal resource. In some embodiments, the QCL information comprises information of a QCL source reference signal, wherein the QCL source reference signal indicates a spatial filter to be used by the WD for at least one of downlink reception and uplink transmission. In some embodiments, the first and the second unified TCI states are associated to a first and second spatial filter, respectively. In some embodiments, each of the plurality of reference signals is to be received or transmitted with one of the first and second spatial filters. In some embodiments, the at least one of the activation command and the indication includes a first list of reference signals associated with the first unified TCI state, and a second list of reference signals associated with the second unified TCI state. In some embodiments, the at least one of the activation command and the indication includes a first list of reference signals associated with a first pointer pointing to the first unified TCI state, and a second list of reference signals associated with a second pointer pointing to the second unified TCI state. In some embodiments, the at least one of the activation command and the indication includes at least one reference signal pair, wherein the first reference signal in each reference signal pair is associated with the first unified TCI state, and the second reference signal in each reference signal pair is associated with the second unified TCI state. In some embodiments, the at least one of the activation command and the indication includes one or more channel measurement resource groups consisting of reference signals, wherein reference signals in a first set of channel measurement resource groups are associated with the first unified TCI state, and reference signals in a second set of channel measurement resource groups disjoint from the first set of channel measurement resource groups are associated with the second unified TCI state.

Having described the general process flow of arrangements of the disclosure and having provided examples of hardware and software arrangements for implementing the processes and functions of the disclosure, the sections below provide details and examples of arrangements for common spatial filter indications for reference signals in multiple transmission point (TRP) systems. One or more network node 16 functions described herein may be performed by one or more of processing circuitry 68, processor 70, radio interface 62, TCI state unit 32, etc. One or more wireless device 22 functions described herein may be performed by one or more of processing circuitry 84, processor 86, override unit 34, radio interface 82, etc.

As used herein, reference to the transmission configuration indicator (TCI) states may refer to either a "DL TCI state" or an "UL TCI state." Also, the "DL TCI state" and/or "UL TCI state" may be referred to as a "Joint DL/UL TCI state".

FIG. 22 illustrates a schematic example where a list of activated DL TCI states are mapped to a set of TCI field codepoints in a DCI for Joint DL/UL TCI update for single-TRP based operation. The mapping of DL TCI states to codepoints in the TCI field may be done by MAC CE. In this case, a codepoint of the TCI field in DCI may be used to update a DL TCI state, which may be used by the WD 22 to determine TX/RX spatial filter for both DL and UL signals/channels. For example, in case codepoint 2 is indicated to the WD 22, the WD 22 may update its TX/RX spatial filters based on DL TCI state 9 for both DL and UL signals/channels.

FIG. 23 illustrates a schematic example where a list of activated DL TCI state pairs are mapped to a set of TCI field codepoints in a DCI for Joint DL/UL TCI update for multi-TRP based operation. In this case, a single TCI field codepoint in DCI may be used to update two DL TCI states, which may be used to determine two TX/RX spatial filters for both DL and UL signals/channels (e.g., one spatial filter per TRP). For example, in case a DCI with TCI field codepoint 2 is indicated to the WD 22, the WD 22 may update one TX/RX spatial filter based on DL TCI state 9 for both DL and UL signals/channels associated to a first TRP, and one TX/RX spatial filter based on DL TCI 38 for both DL and UL signals/channels associated to a second TRP.

It may be that some TCI field codepoints are associated with two DL TCI states, and some TCI field codepoints are associated with a single DL TCI state. In this case, it may be assumed that an indication of a TCI state codepoint associated with a single DL TCI state, indicates to the WD 22 to update the TX/RX spatial filter for only one of the TRPs (while maintaining the current TX/RX spatial filter for the other TRP).

Which of the first TX/RX spatial filter and the second TX/RX spatial filter is to be updated may also be indicated to the WD 22 when the TCI states are mapped to codepoints of the TCI field the MAC CE. For instance, if a codepoint in the TCI field in DCI is mapped to a single TCI state while other codepoints in the TCI field are mapped to two TCI states, then a field in the MAC CE may indicate whether the single TCI state associated with the codepoint in the TCI field may correspond to a first TX/RX spatial filter or the second spatial filter. Based on the information indicated in the field of the MAC CE, the WD 22 knows which TX/RX spatial filter (the first one or the second one) to update when the TCI field codepoint with single TCI state is indicated to the WD 22 via DCI.

FIG. 24 illustrates a schematic example of how a list of activated DL/UL TCI states and their association to TCI field codepoints in DCI might look for separate DL/UL TCI for single-TRP operation. Here, each TCI field codepoint in DCI is associated with one DL TCI state and one UL TCI state. When a WD 22 is indicated with a certain TCI field codepoint which is mapped to one DL TCI state and one UL TCI state, the WD 22 may apply one DL TCI state and one UL TCI state.

FIG. 25 illustrates a schematic example of how a list of activated DL/UL TCI states and their association to TCI field codepoints in DCI might look for separate DL/UL TCI for multi-TRP operation. Here, each TCI field codepoint in DCI may be associated with two DL TCI states and two UL TCI states. In this case, a single TCI field codepoint in DCI may be used to update two DL TCI states and two UL TCI states, which may be used to determine two RX spatial filters for DL signals/channels (e.g., one spatial filter per TRP) and two TX spatial filters for UL signals/channels. For example, in case a DCI with TCI field codepoint 2 is indicated to the WD 22, the WD 22 may update one RX spatial filter based on DL TCI state 9 for DL signals/channels from a first TRP, one RX spatial filter based on DL TCI state 47 for DL signals/channels from a second TRP, one TX spatial filter based on UL TCI state 9 for UL signals/channels from a first TRP, and one TX spatial filter based on UL TCI state 39 for UL signals/channels from a second TRP.

It may be that some TCI field codepoints are associated with zero, one or two DL TCI states and/or zero, one or two UL TCI states. In this case, it may be assumed that an indication of a TCI state codepoint that is associated with a single DL and/or single UL TCI state, indicates to the WD 22 to update the TX and/or RX spatial filter for only one of the TRPs (while maintaining the current TX and/or RX spatial filter for the other TRP). If zero DL TCI states are associated with an indicated TCI field codepoint, the WD 22 may not update its RX spatial filter(s) (only the TX spatial filer(s) based on the associated UL TCI state(s)). In a similar way, if zero UL TCI states are associated with an indicted TCI field codepoint, the WD 22 may not update its TX spatial filter(s) (only the RX spatial filters based on the associated DL TCI state(s)).

FIG. 26 is an example of activated TCI states and their association to TCI field codepoints in DCI for separate DL/UL TCI operation for multi TRP operation, where some TCI field codepoints are associated with zero, one or two DL TCI states and zero, one or two UL TCI states.

The term TRP may not be used in 3GPP specifications. In some embodiments, a TRP may be either a network node 16, a radio head, a spatial relation, or a Transmission Configuration Indicator (TCI) state. A TRP may be represented by a TCI state in some embodiments. In some embodiments, a TRP may use multiple TCI states. In some embodiments, a TRP may be a part of the network node 16 transmitting and receiving radio signals to/from a WD 22 according to physical layer properties and parameters inherent to that element. In some embodiments, in Multiple Transmit/Receive Point (multi-TRP) operation, a serving cell may schedule WD 22 from two TRPs, providing better PDSCH coverage, reliability and/or data rates. In some embodiments, there are two different operation modes for multi-TRP: single-DCI and multi-DCI. For both modes, control of uplink and downlink operation may be performed by both physical layer and by MAC. In single-DCI mode, the WD 22 may be scheduled by the same DCI for both TRPs and in multi-DCI mode, the WD 22 may be scheduled by independent DCIs from each TRP.

Some embodiments include methods for associating common transmit/receive spatial filters to different DL/UL reference signals for single-DCI based multi-TRP operation. Disclosed herein are details for determining to which DL/UL reference signals the common transmit/receive spatial filters are applied. One or more wireless device 22 functions described below may be performed by one or more of processing circuitry 84, processor 86, override unit 34, etc. One or more network node 16 functions described below may be performed by one or more of processing circuitry 68, processor 70, TCI state unit 32, radio interface 62, etc.

Introduction of "Common Beam Index" and Association to Reference Signals

In some embodiments, a parameter referred to herein as "CommonBeamIndex" is introduced. The parameter may be used to associate DL and/or UL reference signals to one of multiple Joint DL/UL TCI states (or DL TCI states or UL TCI states) activated by DCI for sDCI based multi-TRP operation. That is, the parameter may be used to associate a DL reference signal to one of multiple joint DL/UL TCI states or DL TCI states and to associate an UL reference signal to one of multiple joint DL/UL TCI states or UL TCI states, depending on whether joint DL/UL TCI states or separate DL and UL TCI states are configured. In case of joint DL/UL TCI states are configured, the same common beams are assumed for both DL reception and UL transmission at the WD 22. If separate DL and UL TCI states are configured, different common beams are assumed for DL reception and UL transmission at the WD 22.

In some embodiments, a new information element (IE) is introduced in 3GPP NR TS 38.331 where reference signals that may apply to the new unified TCI state framework are listed and their association to the different "CommonBeamIndexes" are explicitly configured. One example of this is illustrated in FIG. 27, where a WD 22 is configured with two Common beam indexes, CommonBeamIndex1 and CommonBeamIndex2. CommonBeamIndex1 for example could be associated to a first TRP (TRP1) and CommonBeamIndex2 could be associated to a second TRP (TRP2). For each CommonBeamIndex, a list of reference signals are configured (in this example by configuring a set of CSI-RS resource sets and/or SRS resource sets), which will indicate to the WD 22 which reference signals (the CS-RS resources included in the listed CSI-RS resource sets and the SRS resources included in the listed SRS resource sets in this case) that will be associated to which CommonBeamIndex. Since, each CommonBeamIndex will be associated with a TX and/or RX spatial filter indicated by an activated joint TCI state or separate DL and UL TCI states, the WD 22 will then know which TX and/or RX spatial filter to use when receiving/transmitting the listed reference signals.

In some embodiments, the list includes CSI-RS resource(s) and/or SRS resource(s) instead of CSI-RS resource sets and/or SRS resource sets.

In some embodiments, a reference signal may be configured in the list associated with one of the two CommonBeamIndexs, but at the same time have DL/UL TCI states explicitly or implicitly configured in, for example, the SRS resource IE, the CSI-RS resource IE, or through an aperiodic CSI-RS trigger state (as specified in 3GPP TS 38.331). Then the WD 22 determines the TX and/or RX spatial filter for the reference signals based on the explicitly or implicitly configured DL/UL TCI state instead of using the DL/UL TCI state applied for the common beam index. That is:

- when the WD 22 is configured with UL TCI state (or joint DL/UL TCI state) explicitly or implicitly configured for a sounding reference signal (SRS) in, for example, the SRS resource IE, then the explicitly or implicitly configured UL TCI state (or joint DL/UL TCI state) overrides the UL TCI state (or joint DL/UL TCI state) applied for the common beam index;
- when the WD 22 is configured with DL TCI state (or joint DL/UL TCI state) explicitly or implicitly configured for a CSI-RS in, for example, the CSI-RS resource IE, then the explicitly or implicitly configured DL TCI state (or joint DL/UL TCI state) overrides the DL TCI state (or joint DL/UL TCI state) applied for the common beam index; and/or when the WD 22 is configured with DL TCI state (or joint DL/UL TCI state) explicitly or implicitly configured for an aperiodic CSI-RS through an aperiodic CSI-RS trigger state, then the explicitly or implicitly configured DL TCI state (or joint DL/UL TCI state) overrides the DL TCI state (or joint DL/UL TCI state) applied for the common beam index.

In some embodiments, when the WD 22 is configured by the network to operate in common beam mode for single-DCI based multi-TRP schemes, the WD 22 should determine the TX and/or RX spatial filter for the reference signals based on the DL/UL TCI state (or joint DL/UL TCI state) applied for the common beam index. This determination may be instead of the explicitly or implicitly configured DL/UL TCI state (or joint DL/UL TCI state) in, for example, the SRS resource IE, CSI-RS resource IE or through an aperiodic CSI-RS trigger state. That is, when the WD 22 is configured to operate in common beam mode, then one or more of the following steps may be performed:

when the WD 22 is configured with UL TCI state (or joint DL/UL TCI state) explicitly or implicitly configured for a SRS in, for example, the SRS resource IE, then the explicitly or implicitly configured UL TCI state (or joint DL/UL TCI state) is overridden by the UL TCI state (or joint DL/UL TCI state) applied for the common beam index;

when the WD 22 is configured with DL TCI state (or joint DL/UL TCI state) explicitly or implicitly configured for a CSI-RS in, for example, the CSI-RS resource IE, then the explicitly or implicitly configured DL TCI state (or joint DL/UL TCI state) is overridden by the DL TCI state (or joint DL/UL TCI state) applied for the common beam index; and/or when the WD 22 is configured with DL TCI state (or joint DL/UL TCI state) explicitly or implicitly configured for an aperiodic CSI-RS through an aperiodic CSI-RS trigger state, then the explicitly or implicitly configured DL TCI state (or joint DL/UL TCI state) is overridden by the DL TCI state (or joint DL/UL TCI state) applied for the common beam index;

In some embodiments, lists of reference signals or reference signal resource sets for the common beam index may not be higher layer configured. Instead, which reference signals or reference signal resource sets correspond to a Common beam index may be indicated to the WD 22 via a MAC CE. For example, the following may be provided in the MAC CE:

NZP-CSI-RS-ResourceSet Id 1, NZP-CSI-RS-ResourceSet Id 2, and NZP-CSI-RS-ResourceSet Id 4 are indicated in MAC CE fields within the MAC CE along with their associated common beam index (e.g., CommonBeamIndex1) which may be indicated by one or more fields within the MAC CE; and/or NZP-CSI-RS-ResourceSet Id 3, and NZP-CSI-RS-ResourceSet Id 5 are indicated in MAC CE fields within the MAC CE along with their associated common beam index (e.g., CommonBeamIndex2) which may be indicated by one or more fields within the MAC CE.

Although the above example shows NZP-CSI-RS-ResourceSet IDs being associated with a common beam index via MAC CE, some embodiments are equally applicable for NZP CSI-RS resources (by replacing NZP-CSI-RS-ResourceSet Id's with NZP CSI-RS resource Id's), SRS resource sets (by replacing NZP-CSI-RS-ResourceSet Id's with SRS resource set Id's), or SRS resources (by replacing NZP-CSI-RS-ResourceSet Id's with SRS resource Id's).

In some embodiments, NZP CSI-RS resource sets/NZP CSI-RS resources/SRS resource sets/SRS resources associated with a first common beam index apply a first common beam (i.e., first applied DL TCI state/UL TCI state/joint DL/UL TCI state using the unified TCI state framework). Similarly, NZP CSI-RS resource sets/NZP CSI-RS resources/SRS resource sets/SRS resources associated with a second common beam index apply a second common beam (i.e., second applied DL TCI state/UL TCI state/joint DL/UL TCI state using the unified TCI state framework).

If no DL and/or UL TCI states for a CommonBeamIndex is applied (for example, the network node 16 might suddenly turn off one of the CommonBeamIndexes and use single-TRP operation instead), the WD 22 may determine the TX and/or RX spatial filter for the reference signals associated with that CommonBeamIndex in another way. In some embodiments, the WD 22 assumes that the configured reference signals in the list associated with a CommonBeamIndex that has no applied DL and/or UL TCI state, follows the DL and/or UL TCI state of the other CommonBeamIndex. For example, assume that CommonBeamIndex1 has a configured list that includes CSI-RS resource 1 and SRS resource 1, and CommonBeamIndex2 has a configured list that includes CSI-RS resource 2 and SRS resource 2. Assume further that DL TCI state 1 (or joint DL/UL TCI state 1) is activated for CommonBeamIndex1 and that DL TCI state 2 (or joint DL/UL TCI state 2) is activated for CommonBeamIndex2. In some embodiments, this means that the WD 22 determines TX/RX spatial filter for CSI-RS resource 1 and SRS 1 based on DL TCI state 1 (or joint DL/UL TCI state 1), and determines TX/RX spatial filter for CSI-RS 2 and SRS 2 based on DL TCI state 2 (or joint DL/UL TCI state 2). Assume next that the WD 22 receives a TCI field codepoint indicating that CommonBeamIndex1 should apply DL TCI state 3 and that CommonBeamIndex2 should be de-activated; in this case, the WD 22 determines TX/RX spatial filter for CSI-RS1, CSI-RS 2, SRS 1 and SRS 2 based on DL TCI state 3.

In some embodiments, the MAC-CE used to activate/deactivate semi-persistent reference signal(s) includes indication of CommonBeamIndex (for example, one CommonBeamIndex may be indicated per activated RS resource, per activated RS resource set or for all RSs activated with that MAC-CE). The CommonBeamIndex may be indicated as a field in the MAC CE for each activated RS resource, per activated RS resource set or for all RSs activated. In one example, a new MAC-CE(s) dedicated for activating/deactivating, for example, semi persistent CSI-RS resource and/or semi-persistent SRS resources for the unified TCI state framework includes one or several CommonBeamIndex(s). In another example, the existing MAC-CEs (specified in 3GPP TS 38.321) used to activate, for example, SP CSI-RS resource and/SP SRS resource are modified to include one or multiple CommonBeamIndexes (for example by using a reserved bit or a dedicated MAC CE field for each CommonBeamIndex).

In some embodiments, in case separate DL/UL TCI are applied for a CommonBeamIndex, then the WD 22 may:

determine a RX spatial filter for the DL RS(s) configured in the list corresponding to that CommonBeamIndex based on the applied DL TCI state for the CommonBeamIndex; and/or determine a TX spatial filter for the UL RS(s) configured in the list corresponding to that CommonBeamIndex based on the applied UL TCI state for the CommonBeamIndex.

However, since some DL RSs might be used to determine reciprocity based UL precoding (e.g., the CSI-RS resource used for determining SRS precoding for non-codebook based PUSCH transmission as described in 3GPP TS 38.214) and some UL RSs might be used to determine DL reciprocity precoding (for example SRS with usage 'antennaSwitching' as specified in 3GPP TS 38.214), in some embodiments, the WD 22 may:

determine RX spatial filter for some DL RSs configured in the list corresponding to a CommonBeamIndex (e.g. CSI-RS for non-codebook based operation) based on the applied UL TCI state for that CommonBeamIndex; and/or determine the TX spatial filter for some UL RSs configured in the list corresponding to a CommonBeamIndex (e.g. SRS resources with usage 'antennaSwitching') based on the applied DL TCI state for that CommonBeamIndex.

Exactly which DL RS(s) and UL RS(s) follows the applied DL or UL TCI state for a CommonBeamIndex may either be implicitly indicated (for example, through the specification) or explicitly configured using RRC and/or MAC-CE signaling.

In some embodiments, instead of configuring a new IE listing which reference signals are to be associated with which CommonBeamIndex, a CommonBeamIndex could be explicitly configured in respective reference signal resource (or reference signal resource set). FIG. 28 shows one example of a CommonBeamIndex IE for a CSI-RS resource.

Some embodiments described herein may be extended to semi-persistent scheduling, e.g., configured grants.

In some embodiments, when channel measurement resource (CMR) pairs are configured to be used for channel measurement for computing CSI associated with NC-JT CSI measurement hypothesis:

a first common beam (i.e., first applied DL TCI state/joint DL/UL TCI state using the unified TCI state framework) is applied to the first NZP CSI-RS resource in each CMR pair (i.e., the first CMR in the CMR pair); and a second common beam (i.e., second applied DL TCI state/joint DL/UL TCI state using the unified TCI state framework) is applied to the second NZP CSI-RS resource in each CMR pair (i.e., the second CMR in the CMR pair).

In some embodiments, when different CMR groups are configured for CSI measurement associated with a CSI reporting setting, CSI-ReportConfig, for NC-JT:

a first common beam (i.e., first applied DL TCI state/joint DL/UL TCI state using the unified TCI state framework) is applied to the NZP CSI-RS resources (i.e., CMRs) in the first CMR group; and/or a second common beam (i.e., second applied DL TCI state/joint DL/UL TCI state using the unified TCI state framework) is applied to the NZP CSI-RS resources (i.e., CMRs) in the second CMR group.

SFN (Single Frequency Network) Based NZP CSI-RS:

In a SFN scheme, the network node 16 transmits a NZP CSI-RS from two or more TRPs to a wireless device 22. The network node 16 may indicate about this SFN transmission to the wireless device 22 by configuring 2 or more TCI states for the NZP CSI-RS. When the wireless device 22 is receiving a NZP CSI-RS for CSI computation that is configured with two TCI states, the WD 22 may perform synchronization and estimation of large scale channel properties (such as average delay, delay spread, Doppler shift, spatial direction, etc.) using the DL RS (e.g., TRS) indicated in both TCI states. For example, wireless device 22 may obtain two channel delay spreads (which may be compared to legacy operation where a single channel delay spread is obtained). The wireless device 22 may then combine these measurements to obtain the channel properties of the SFN channel. For example, the WD 22 may compute a weighted average of the delay spreads. This average may then be used as input to the channel estimation algorithm for the NZP CSI-RS for CSI computation. Note that the NZP CSI-RS is transmitted as SFN while the DL RS (e.g., TRS) are not transmitted as SFN, they are transmitted "per TRP". So the measurements on the TRS provides the wireless device 22 with information on whether one TRP is dominating over the other, e.g., if the wireless device 22 is close to one of the TRPs or if the channel towards one of the TRPs is blocked. An algorithm in the wireless device 22 may then decide to only use estimates from one of the TRS (one TCI states) as the SFN transmission is weak (meaning that even if NZP CSI-RS for CSI computation is SFN transmitted, one TRP is dominating).

In some embodiments, when a NZP CSI-RS is configured (either implicitly or explicitly) to be used for SFN based CSI-RS reception/measurement, and the WD 22 has two common beams (i.e., two applied DL TCI states (or joint DL/UL TCI states) using the unified TCI state framework), the WD 22 may implicitly assume that it should determine two RX spatial filters when receiving that NZP CSI-RS, where a first RX spatial filter may be determined based on a first applied DL TCI state (or joint DL/UL TCI state) associated with a first common beam, and a second RX spatial filter may be determined based on a second applied DL TCI state (or joint DL/UL TCI state) associated with a second common beam (i.e., no explicit indication is needed).

According to one aspect, a network node 16 configured to communicate with a wireless device (WD) is provided. The network node 16 includes a radio interface 62 and/or comprising processing circuitry 68 configured to: configure the WD 22 with a plurality of common beam indices, each common beam index corresponding to a set of reference signals; and transmit each set of reference signals on a beam corresponding to the common beam index.

According to this aspect, in some embodiments, a set of reference signals includes one of a channel state information reference signal, CSI-RS, and a sounding reference signal, SRS. In some embodiments, the processing circuitry is further configured to indicate to the WD 22 at least one of a downlink transmission configuration indicator, TCI, state and an uplink TCI state.

According to another aspect, a method implemented in a network node 16 configured to communicate with a wireless device, WD 22, is provided. The method includes: configuring the WD 22 with a plurality of common beam indices, each common beam index corresponding to a set of reference signals; and transmitting each set of reference signals on a beam corresponding to the common beam index.

According to this aspect, in some embodiments, a set of reference signals includes one of a channel state information reference signal, CSI-RS, and a sounding reference signal, SRS. In some embodiments, the method also includes indicating to the WD 22 at least one of a downlink transmission configuration indicator, TCI, state and an uplink TCI state.

According to another aspect, a WD 22 is configured to communicate with a network node 16. The WD 22 includes a radio interface 82 and/or processing circuitry 84 configured to: receive at least one of an uplink transmission configuration indicator, TCI, state configuration, a downlink TCI state configuration and a joint downlink/uplink TCI state configuration; when the received TCI state is an uplink TCI state configuration for a sounding reference signal, SRS, then override the uplink TCI state configuration applied to a common beam index by the received uplink TCI state configuration; and when the received TCI state is a DL TCI state configuration for a channel state information reference signal, CSI-RS, then override the downlink TCI state configuration applied to the common beam index by the received downlink TCI state configuration. According to this aspect, in some embodiments, the common beam index is associated with a transmission and reception point, TRP.

According to yet another aspect, a method implemented in a WD 22 includes receiving at least one of an uplink transmission configuration indicator, TCI, state configuration, a downlink TCI state configuration and a joint downlink/uplink TCI state configuration; when the received TCI state is an uplink TCI state configuration for a sounding reference signal, SRS, then overriding the uplink TCI state configuration applied to a common beam index by the received uplink TCI state configuration; and when the received TCI state is a DL TCI state configuration for a channel state information reference signal, CSI-RS, then overriding the downlink TCI state configuration applied to the common beam index by the received downlink TCI state configuration. According to this aspect, in some embodiments, the common beam index is associated with a transmission and reception point. TRP.

According to another aspect, a WD 22 is configured to communicate with a network node 16. The WD 22 includes a radio interface and/or processing circuitry configured to: receive at least one of an uplink transmission configuration indicator, TCI, state configuration, a downlink TCI state configuration and a joint downlink/uplink TCI state configuration; when the received TCI state is an uplink TCI state configuration for a sounding reference signal, SRS, then override the received uplink TCI state configuration by an uplink TCI state configuration applied to a common beam index; and when the received TCI state is a DL TCI state configuration for a channel state information reference signal, CSI-RS, then override the received downlink TCI state configuration by a downlink TCI state configuration applied to the common beam index.

According to yet another aspect, a method implemented in a WD 22 includes: receiving at least one of an uplink transmission configuration indicator, TCI, state configuration, a downlink TCI state configuration and a joint downlink/uplink TCI state configuration; when the received TCI state is an uplink TCI state configuration for a sounding reference signal, SRS, then overriding the received uplink TCI state configuration by an uplink TCI state configuration applied to a common beam index; and when the received TCI state is a DL TCI state configuration for a channel state information reference signal, CSI-RS, then overriding the received downlink TCI state configuration by a downlink TCI state configuration applied to the common beam index.

Some embodiments may include one or more of the following:

Embodiment A1. A network node configured to communicate with a wireless device (WD), the network node configured to, and/or comprising a radio interface and/or comprising processing circuitry configured to:

configure the WD with a plurality of common beam indices, each common beam index corresponding to a set of reference signals; and transmit each set of reference signals on a beam corresponding to the common beam index.

Embodiment A2. The network node of Embodiment A1, wherein a set of reference signals includes one of a channel state information reference signal, CSI-RS, and a sounding reference signal, SRS.

Embodiment A3. The network node of any of Embodiments A1 and A2, wherein the processing circuitry is further configured to indicate to the WD at least one of a downlink transmission configuration indicator, TCI, state and an uplink TCI state.

Embodiment B1. A method implemented in a network node configured to communicate with a wireless device, WD, the method comprising:

configuring the WD with a plurality of common beam indices, each common beam index corresponding to a set of reference signals; and transmitting each set of reference signals on a beam corresponding to the common beam index.

Embodiment B2. The method of Embodiment B1, wherein a set of reference signals includes one of a channel state information reference signal, CSI-RS, and a sounding reference signal, SRS.

Embodiment B3. The method of any of Embodiments B1 and B2, further comprising indicating to the WD at least one of a downlink transmission configuration indicator, TCI, state and an uplink TCI state.

Embodiment C1. A wireless device (WD) configured to communicate with a network node, the WD configured to, and/or comprising a radio interface and/or processing circuitry configured to:

receive at least one of an uplink transmission configuration indicator, TCI, state configuration, a downlink TCI state configuration and a joint downlink/uplink TCI state configuration;

when the received TCI state is an uplink TCI state configuration for a sounding reference signal, SRS, then override the uplink TCI state configuration applied to a common beam index by the received uplink TCI state configuration; and when the received TCI state is a DL TCI state configuration for a channel state information reference signal, CSI-RS, then override the downlink TCI state configuration applied to the common beam index by the received downlink TCI state configuration.

Embodiment C2. The WD of Embodiment C1, wherein the common beam index is associated with a transmission and reception point, TRP.

Embodiment D1. A method implemented in a wireless device (WD), the method comprising:

receiving at least one of an uplink transmission configuration indicator, TCI, state configuration, a downlink TCI state configuration and a joint downlink/uplink TCI state configuration;

when the received TCI state is an uplink TCI state configuration for a sounding reference signal, SRS, then overriding the uplink TCI state configuration applied to a common beam index by the received uplink TCI state configuration; and when the received TCI state is a DL TCI state configuration for a channel state information reference signal, CSI-RS, then overriding the downlink TCI state configuration applied to the common beam index by the received downlink TCI state configuration.

Embodiment D2. The method of Embodiment D1, wherein the common beam index is associated with a transmission and reception point, TRP.

Embodiment E1. A wireless device (WD) configured to communicate with a network node, the WD configured to, and/or comprising a radio interface and/or processing circuitry configured to:

receive at least one of an uplink transmission configuration indicator, TCI, state configuration, a downlink TCI state configuration and a joint downlink/uplink TCI state configuration;

when the received TCI state is an uplink TCI state configuration for a sounding reference signal, SRS, then override the received uplink TCI state configuration by an uplink TCI state configuration applied to a common beam index; and when the received TCI state is a DL TCI state configuration for a channel state information reference signal, CSI-RS, then override the received downlink TCI state configuration by a downlink TCI state configuration applied to the common beam index.

Embodiment F1. A method implemented in a wireless device (WD), the method comprising:

receiving at least one of an uplink transmission configuration indicator, TCI, state configuration, a downlink TCI state configuration and a joint downlink/uplink TCI state configuration;

when the received TCI state is an uplink TCI state configuration for a sounding reference signal, SRS, then overriding the received uplink TCI state configuration by an uplink TCI state configuration applied to a common beam index; and when the received TCI state is a DL TCI state configuration for a channel state information reference signal, CSI-RS, then overriding the received downlink TCI state configuration by a downlink TCI state configuration applied to the common beam index.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a wireless device (WD), configured to communicate with a network node, the method comprising:

receiving at least one of an activation command and an indication for a first and second transmission configuration indicator (TCI) state out of a plurality of TCI states, each of the first and second TCI states including quasi co-location (QCL) information for at least one of downlink reception and uplink transmission of a plurality of reference signals by the WD; and receiving signaling indicating an association of each of a plurality of reference signals with one of the first and second TCI states.

2. The method of claim 1, wherein the activation command is a first medium access control (MAC) control element (CE) command to activate a subset of TCI states from the plurality of TCI states.

3. The method of claim 2, wherein the indication is sent in downlink control information (DCI) format when there are more than two TCI states activated by the first MAC CE command.

4. The method of claim 1, wherein each of the plurality of reference signals can be one of a downlink channel state information (CSI) reference signal (CSI-RS) and a uplink sounding reference signal (SRS).

5. The method of claim 1, wherein a reference signal configuration for a reference signal is a configuration of an aperiodic CSI triggering state containing a reference signal resource.

6. A wireless device (WD), configured to communicate with a network node, the WD comprising:

processing circuitry configured to:

receive at least one of an activation command and an indication for a first and second unified transmission configuration indicator (TCI) state out of a plurality of TCI states, each of the first and second TCI states including quasi co-location (QCL) information for at least one of downlink reception and uplink transmission of a plurality of reference signals by the WD; and receive signaling indicating an association of each of a plurality of reference signals with one of the first and second TCI states.

7. The WD of claim 6, wherein the activation command is a first medium access control (MAC) control element (CE) command to activate a subset of TCI states from the plurality of TCI states.

8. The WD of claim 7, wherein the indication is sent in downlink control information (DCI) format when there are more than two TCI states activated by the first MAC CE command.

9. The WD of claim 6, wherein each of the plurality of reference signals can be one of a downlink channel state information (CSI) reference signal (CSI-RS) and a uplink sounding reference signal (SRS).

10. The WD of claim 6, wherein a reference signal configuration for a reference signal is a configuration of an aperiodic CSI triggering state containing a reference signal resource.

11. A method in a network node, configured to communicate with a wireless device (WD), the method comprising:

sending at least one of an activation command and an indication for a first and second unified transmission configuration indicator (TCI) state out of a plurality of TCI states, each of the first and second TCI states including quasi co-location (QCL) information for at least one of downlink reception and uplink transmission of a plurality of reference signals by the WD; and sending signaling indicating an association of each of a plurality of reference signals with one of the first and second TCI states.

12. The method of claim 11, wherein the activation command is a first medium access control (MAC) control element (CE) command to activate a subset of TCI states from the plurality of TCI states.

13. The method of claim 12, wherein the indication is sent in downlink control information (DCI) format when there are more than two TCI states activated by the first MAC CE command.

14. The method of claim 11, wherein each of the plurality of reference signals can be one of a downlink channel state information (CSI) reference signal (CSI-RS) and a uplink sounding reference signal (SRS).

15. The method of claim 11, wherein a reference signal configuration for a reference signal is a configuration of an aperiodic CSI triggering state containing a reference signal resource.

16. A network node, configured to communicate with a wireless device (WD), the network node comprising:

processing circuitry configured to:

cause transmission of at least one of an activation command and an indication for a first and second unified transmission configuration indicator (TCI) state out of a plurality of TCI states, each of the first and second TCI states including quasi co-location (QCL) information for at least one of downlink reception and uplink transmission of a plurality of reference signals by the WD; and cause transmission of signaling indicating an association of each of a plurality of reference signals with one of the first and second TCI states.

17. The network node of claim 16, wherein the activation command is a first medium access control (MAC) control element (CE) command to activate a subset of TCI states from the plurality of TCI states.

18. The network node of claim 17, wherein the indication is sent in downlink control information (DCI) format when there are more than two TCI states activated by the first MAC CE command.

19. The network node of claim 16, wherein each of the plurality of reference signals can be one of a downlink channel state information (CSI) reference signal (CSI-RS) and a uplink sounding reference signal (SRS).

20. The network node of claim 16, wherein a reference signal configuration for a reference signal is a configuration of an aperiodic CSI triggering state containing a reference signal resource.

* * * * *